(12) United States Patent
Lanham

(10) Patent No.: US 10,946,471 B2
(45) Date of Patent: *Mar. 16, 2021

(54) TIP DRESSER BLADE

(71) Applicant: SEMTORQ, INC., Twinsburg, OH (US)

(72) Inventor: Greg Lanham, Twinsburg, OH (US)

(73) Assignee: Semtorq, Inc., Twinsburg, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/453,434

(22) Filed: Jun. 26, 2019

(65) Prior Publication Data

US 2019/0314926 A1    Oct. 17, 2019

Related U.S. Application Data

(63) Continuation of application No. 15/730,069, filed on Oct. 11, 2017, now Pat. No. 10,335,893.

(60) Provisional application No. 62/462,585, filed on Feb. 23, 2017.

(51) Int. Cl.
| | |
|---|---|
| *B23B 5/16* | (2006.01) |
| *B23K 11/30* | (2006.01) |
| *B23C 5/02* | (2006.01) |
| *B23C 3/12* | (2006.01) |

(52) U.S. Cl.
CPC .......... *B23K 11/3063* (2013.01); *B23B 5/166* (2013.01); *B23C 3/12* (2013.01); *B23C 5/02* (2013.01); *B23C 2210/48* (2013.01); *B23C 2228/24* (2013.01)

(58) Field of Classification Search
CPC .............................. B23K 11/3063; B23C 3/12
See application file for complete search history.

(56) References Cited

U.S. PATENT DOCUMENTS

| | | | |
|---|---|---|---|
| 3,388,618 | A | 6/1968 | Evancic et al. |
| 4,762,446 | A | 8/1988 | Nishiwaki |
| 4,765,446 | A | 8/1988 | Murata et al. |
| 4,921,377 | A | 5/1990 | Hoch et al. |
| 4,966,504 | A | 10/1990 | Seme, Jr. et al. |
| 4,966,506 | A | 10/1990 | Slanker |
| 5,332,342 | A | 7/1994 | Kizaki et al. |
| 7,789,600 | B2 | 9/2010 | Goto et al. |
| 8,833,749 | B2 | 9/2014 | Park |
| 8,851,811 | B2 | 10/2014 | Sigler et al. |
| 8,920,218 | B2 | 12/2014 | Moision et al. |

(Continued)

FOREIGN PATENT DOCUMENTS

| | | |
|---|---|---|
| EP | 2 332 685 | 6/2011 |
| EP | 3 025 817 | 6/2016 |

(Continued)

OTHER PUBLICATIONS

IL Patent Office, "International Search Report ," WO 2018 156 226, PCT/US2017/062584, dated Aug. 30, 2018.

(Continued)

*Primary Examiner* — Alan Snyder
(74) *Attorney, Agent, or Firm* — Emerson Thomson Bennett LLC; Daniel A. Thomson

(57) ABSTRACT

Provided is a tip dresser blade comprising a body of M-2 steel hardened to a Rockwell C hardness in the range of 63 to 66, inclusive, by double tempering. The body may be ground to provide a specific first geometry, or a specific second geometry, or a specific third geometry, or a specific fourth geometry.

20 Claims, 22 Drawing Sheets

(56) References Cited

U.S. PATENT DOCUMENTS

| | | |
|---|---|---|
| 9,346,118 B2 | 5/2016 | Sigler et al. |
| 10,213,867 B2 | 2/2019 | Lanham |
| 10,335,893 B2 | 7/2019 | Lanham |
| 2005/0211677 A1 | 9/2005 | Chen |
| 2015/0053654 A1 | 2/2015 | Sigler et al. |
| 2017/0225263 A1 | 8/2017 | Sigler et al. |
| 2018/0236593 A1 | 8/2018 | Lanham |

FOREIGN PATENT DOCUMENTS

| | | |
|---|---|---|
| FR | 3 014 002 | 6/2015 |
| WO | 2007 015 399 | 2/2007 |

OTHER PUBLICATIONS

IL Patent Office, "International Search Report," WO 2018 156 225, PCT/US2017/062579, dated Aug. 30, 2018.

SECTION A-A

SECTION A-A

TIP DRESSER BLADE

CROSS-REFERENCE TO RELATED APPLICATIONS

This application is a continuation of U.S. application Ser. No. 15/730,069, filed Oct. 11, 2017, now U.S. Pat. No. 10,335,893, which claims the benefit of U.S. Provisional Application No. 62/462,585, filed Feb. 23, 2017.

I. BACKGROUND

The present subject matter is tip dressing of spot welder tips. More specifically, the present technology is directed to the material and geometry of a tip dresser blade.

Spot welding typically uses pairs of shaped electrodes to concentrate the applied welding current in a spot clamped therebetween. Welding heat results from the resistance to the applied welding current. Welding electrodes are typically made from a material having low electrical resistance such as copper or copper alloy. The size and shape of the electrode depends on the application. Weld quality in a particular application can depend greatly on the size and shape and material of the electrode.

With each weld, the electrodes change slightly in shape, size, and surface material from heat, pressure, and accumulation of corrosion or debris built up thereon. These changes in the electrodes can degrade the quality of subsequent welds. In order to maintain the desired weld quality and extend electrode service life, after a certain number of welds, it is common to perform a tip dressing operation, also known as "tip dress", on the electrodes in order to clean off buildup or corrosion, reshape the electrode tip or otherwise restore the electrode to the desired size, shape, material or combination thereof. Typically, a tip dress comprises a milling operation directed to milling the face of the electrode with a cutting blade known as a tip dresser blade. The tip dress typically involves operationally engaging the electrode and the tip dresser blade and cutting away material from the electrode by rotating the tip dresser blade relative to the electrode for a certain time.

There are multiple technical challenges present in tip dressing technology. The time that it takes for a tip dress is time the tip being dressed is not available for welding, also known as "down time", so it is desirable to reduce or minimize the time needed to produce the desired tip dress. Also, the tip dresser device itself requires maintenance: the tip dress blade typically requires replacing or sharpening at some service interval. The time that it takes to perform maintenance on the tip dresser device, such as replacement or sharpening of the tip dress blade, can also result in down time, so it is desirable to reduce or minimize tip dresser device maintenance time.

It remains desirable to provide tip dress blades that can perform tip dress operations more quickly than conventional tip dress blades. It remains desirable to provide tip dress blades that remain serviceable for longer times than conventional tip dress blades.

II. SUMMARY

In accordance with one aspect of the present subject matter provided is a tip dresser blade blank comprising a body formed of M-2 steel hardened to a Rockwell C hardness in the range of 63 to 66, inclusive, by double tempering. The body may be ground to provide a specific first geometry, or a specific second geometry, or a specific third geometry, or a specific fourth geometry.

Still other benefits and advantages of the present subject matter will become apparent to those skilled in the art to which it pertains upon a reading and understanding of the following detailed specification.

III. BRIEF DESCRIPTION OF THE DRAWINGS

The present subject matter may take physical form in certain parts and arrangement of parts, embodiments of which will be described in detail in this specification and illustrated in the accompanying drawings which form a part hereof and wherein.

IV. DETAILED DESCRIPTION

Figure 1:
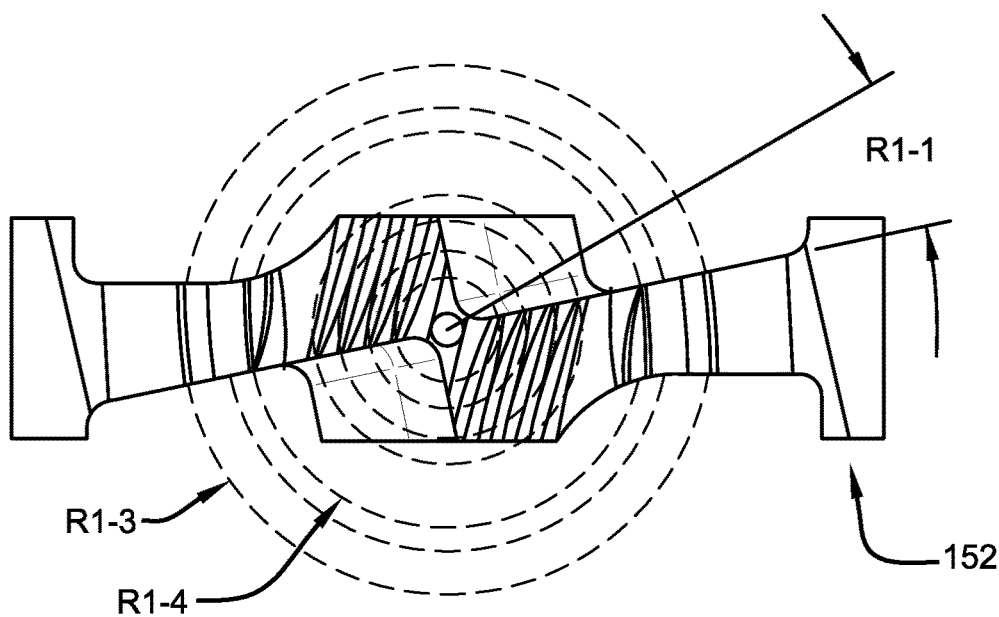
FIG. 1 is a top view of one embodiment of a tip dresser blade.

Referring now to the drawings wherein the showings are for purposes of illustrating embodiments of the present subject matter only and not for purposes of limiting the same, and wherein like reference numerals are understood to refer to like components, provided is a tip dresser blade.

In certain embodiments, a tip dresser blade 152, 154, 156, 158 may comprise a tempered and ground body 100. In certain embodiments, the body 100 may be a formed by casting, forging, machining, or other operations chosen with good engineering judgment. In certain embodiments, the body 100 may be formed of steel. In certain embodiments, the body 100 may be formed of tool steel. In certain embodiments, the body 100 may be a formed of high-speed steel. In certain embodiments, the body 100 may be a formed of tungsten steel, molybdenum high speed steel, or cobalt high speed steel. In certain embodiments, the body 100 may be an M1, M2, M7, M35, M42, or M50 molybdenum high speed steel. It should be understood that the selection of alloy is governed by a multitude of factors including wear resistance, sensitivity to decarburization, and cost.

The body 100 may be tempered once, twice, or more times. In some embodiments the body 100 is tempered to harden it to a Rockwell C hardness in the range of 63 to 66, inclusive. In some embodiments the body 100 is double tempered to harden it to a Rockwell C hardness in the range of 63 to 66, inclusive. In other embodiments, the body 100 may have a hardness less than Rockwell C 63, such as in the range of less than 63 and down to 50 Rockwell C, or greater than Rockwell C 66 such as in the range of more than 66 and up to 80 Rockwell C. A body 100 with a hardness of less than Rockwell C 63 may reduce cost or provide impact resistance. A body 100 with a hardness of greater than Rockwell C 66 may provide increased abrasion resistance and service life. A body 100 having a Rockwell C hardness in the range of 63 to 66, inclusive, may provide a desirable compromise between the qualities of a harder and softer body. A body 100 of M2 steel can be hardened to a Rockwell C hardness in the range of 63 to 66, inclusive, by double tempering, providing high wear resistance, acceptable decarburization sensitivity, high bending strength, and high toughness.

Figure 2:
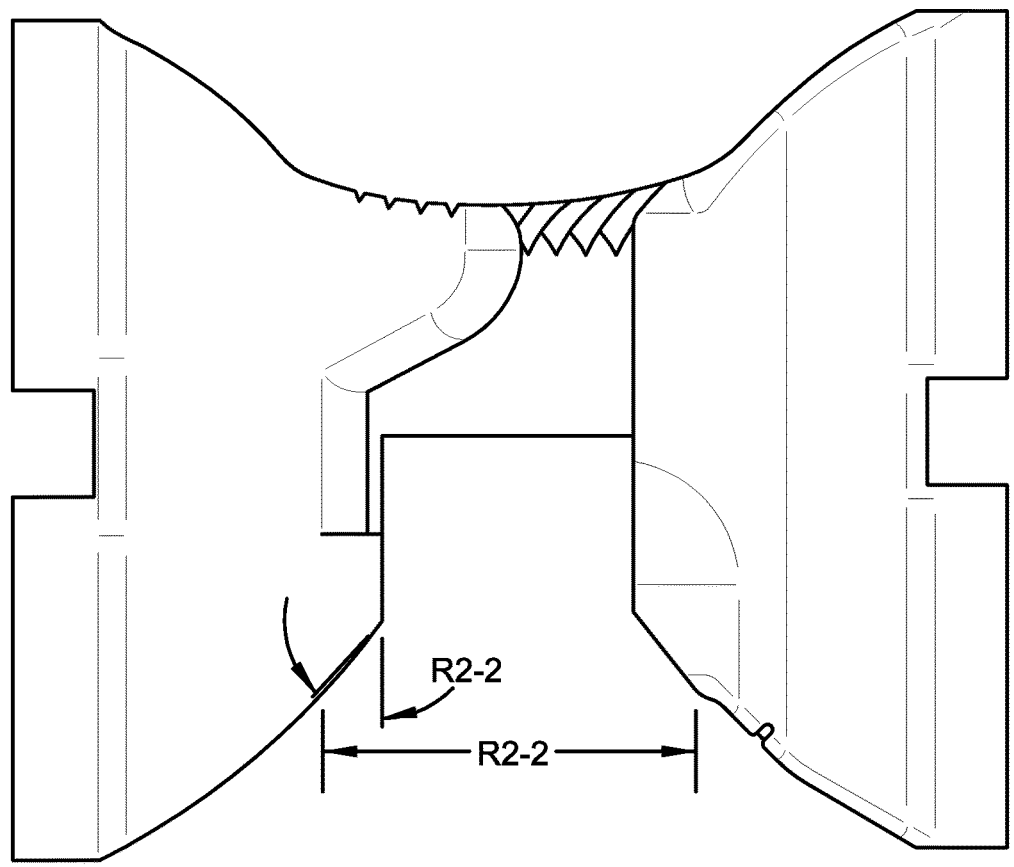
FIG. 2 is a front view of the embodiment of FIG. 1 of a tip dresser blade.
Figure 3:
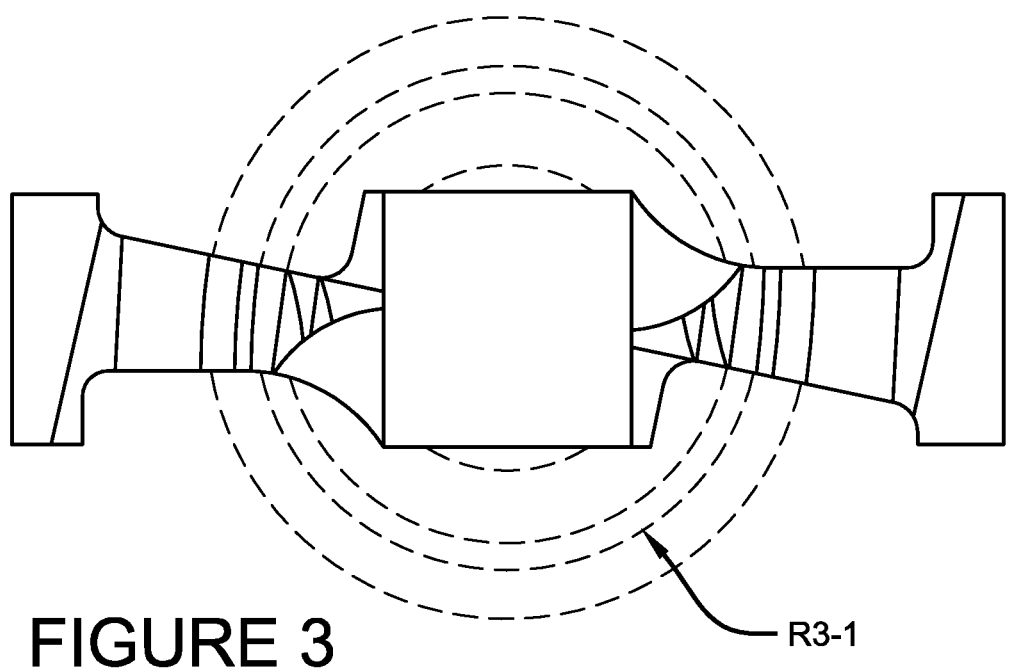
FIG. 3 is a bottom view of the embodiment of FIG. 1 of a tip dresser blade.
Figure 4:
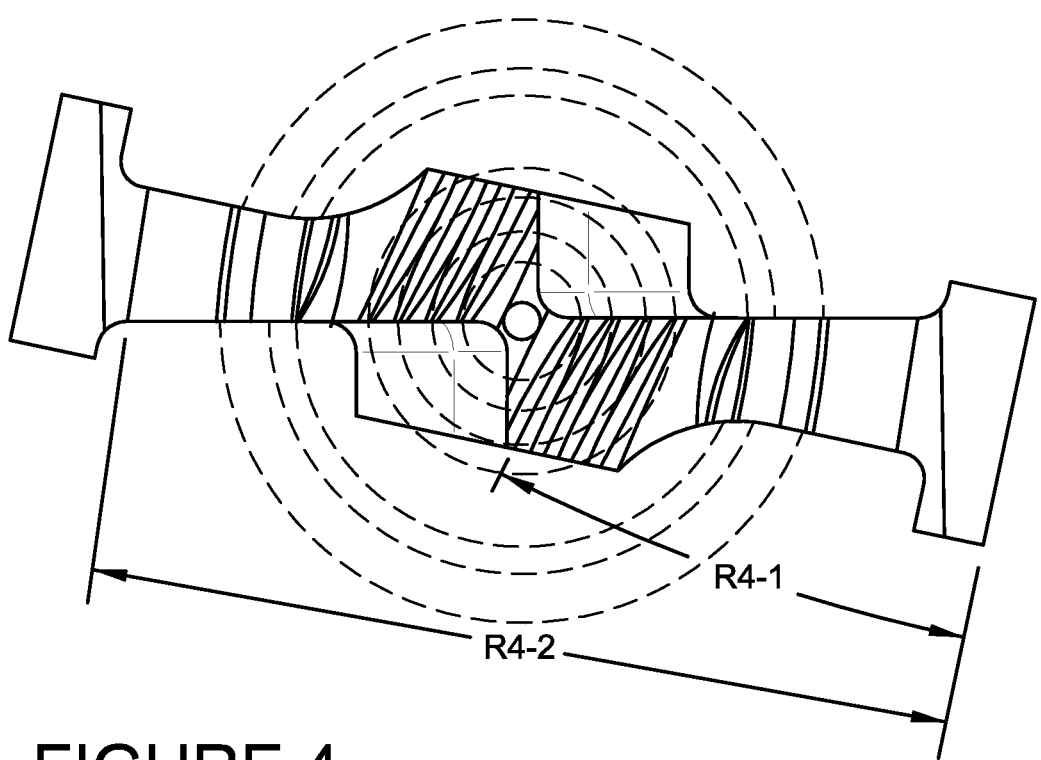
FIG. 4 is a top view of the embodiment of FIG. 1 of a tip dresser blade.
Figure 5:
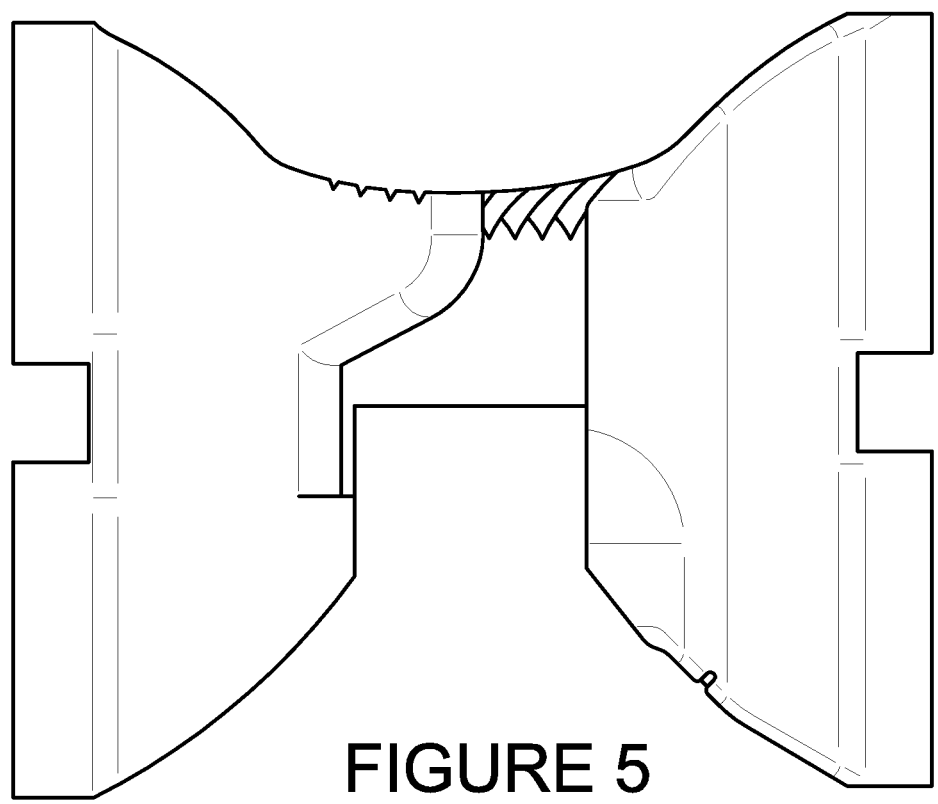
FIG. 5 is a profile view of the embodiment of FIG. 1 of a tip dresser blade.
Figure 6:
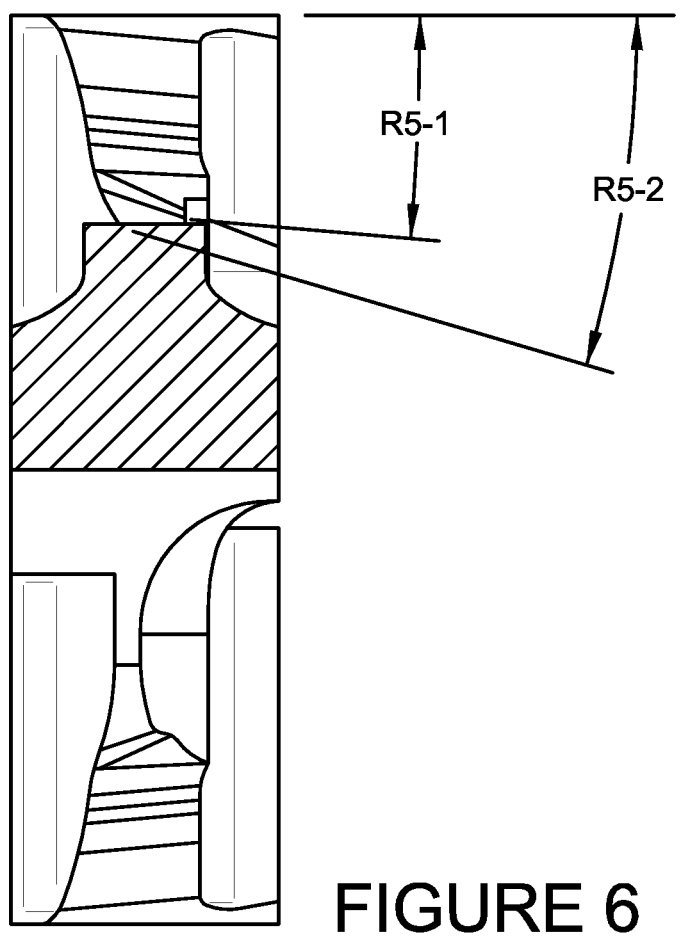
FIG. 6 is a section view of the embodiment of FIG. 1 of a tip dresser blade.
Figure 7:
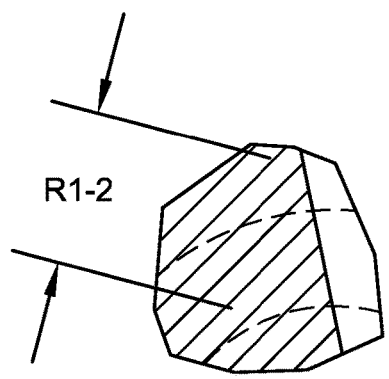
FIG. 7 is a detail view of the embodiment of FIG. 1 of a tip dresser blade.
Figure 8:
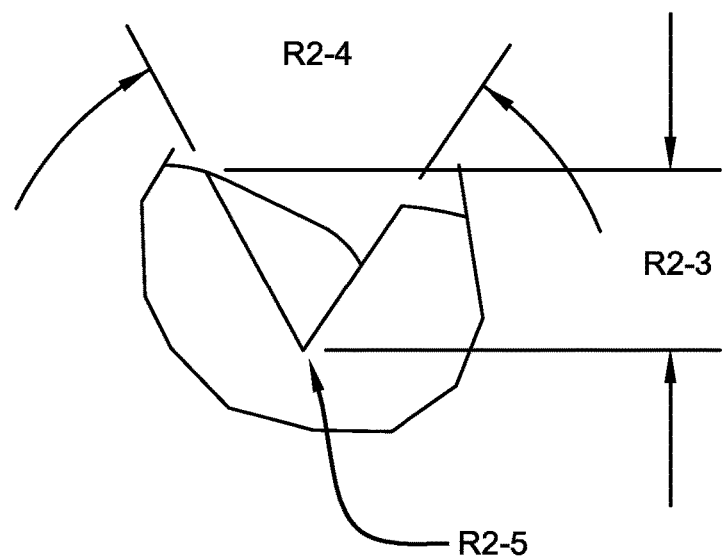
FIG. 8 is a detail view of the embodiment of FIG. 1 of a tip dresser blade.
Figure 9:
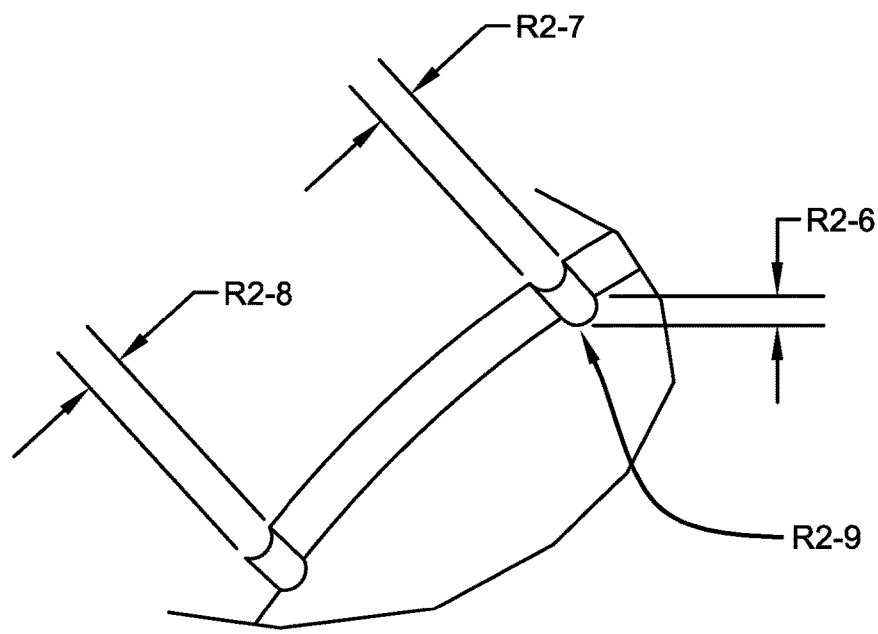
FIG. 9 is a detail view of the embodiment of FIG. 1 of a tip dresser blade.
Figure 10:
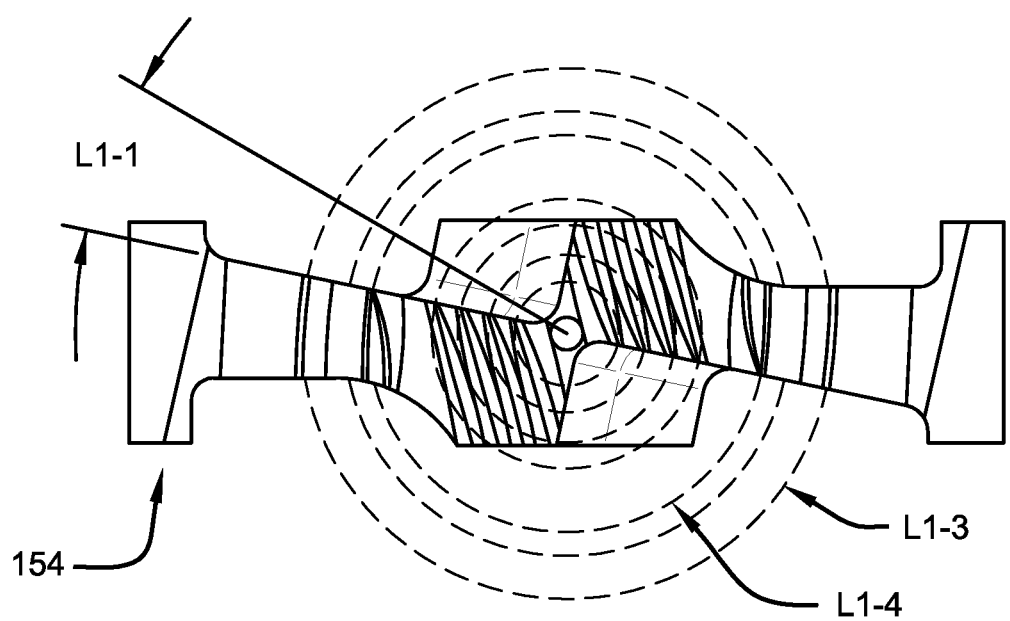
FIG. 10 is a top view of another embodiment of a tip dresser blade.
Figure 11:
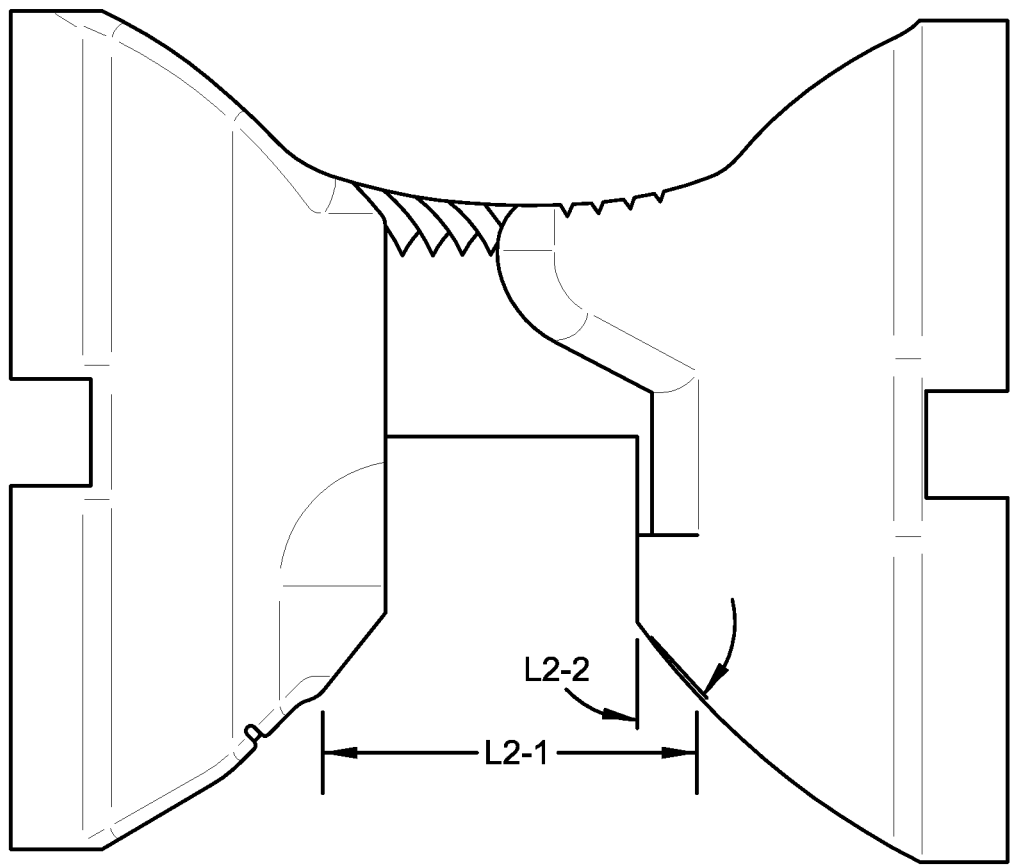
FIG. 11 is a front view of the embodiment of FIG. 10 of a tip dresser blade.
Figure 12:
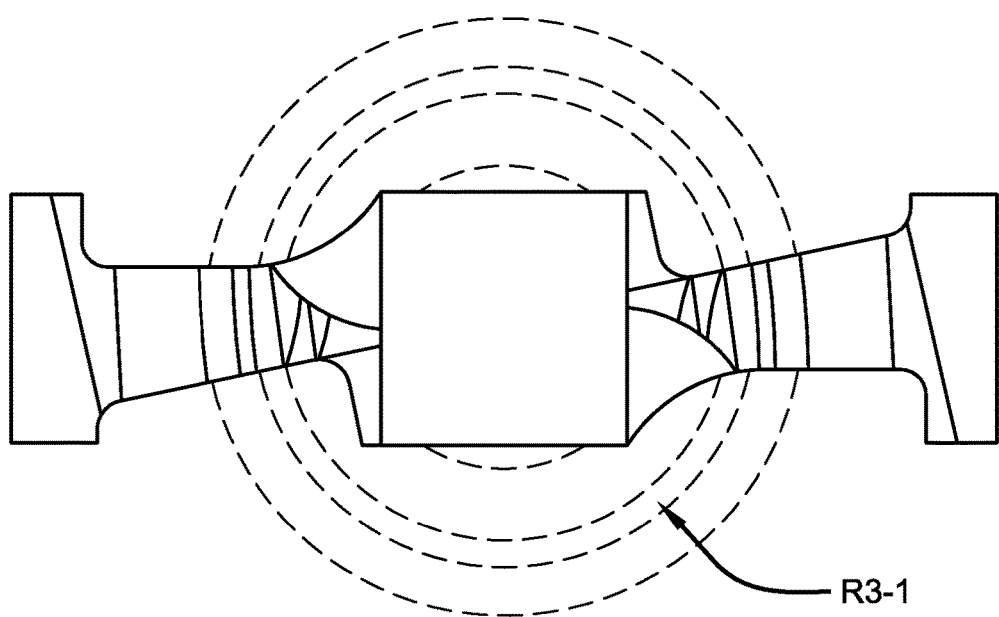
FIG. 12 is a bottom view of the embodiment of FIG. 10 of a tip dresser blade.
Figure 13:
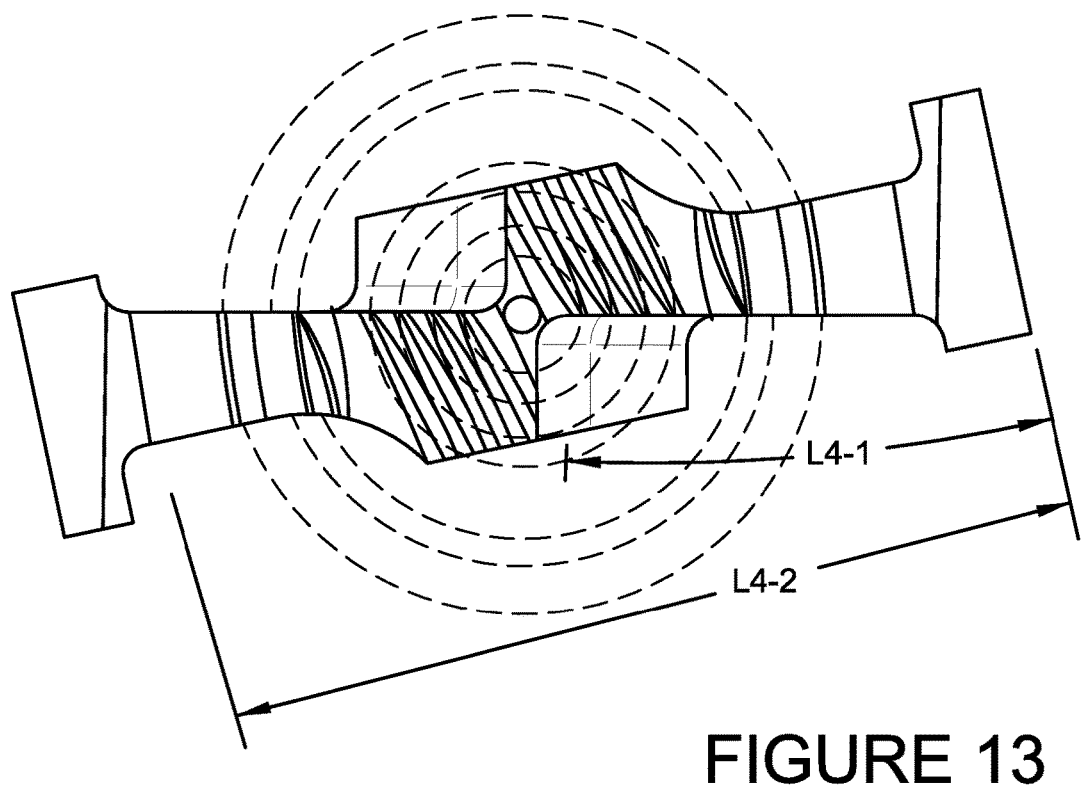
FIG. 13 is a top view of the embodiment of FIG. 10 of a tip dresser blade.
Figure 14:
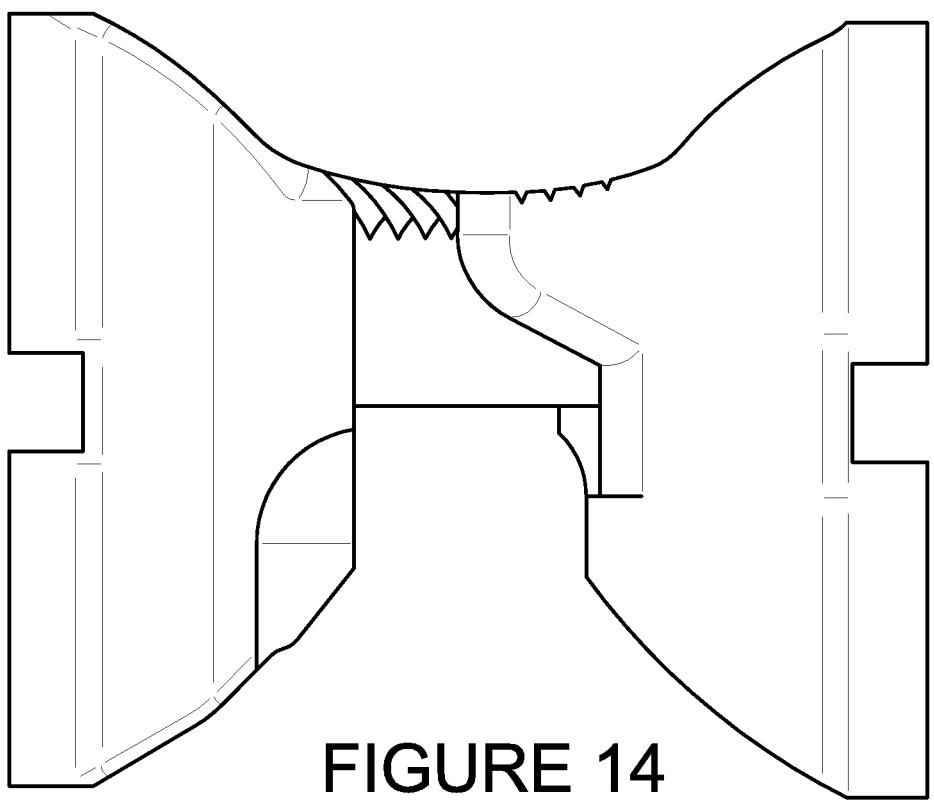
FIG. 14 is a profile view of the embodiment of FIG. 10 of a tip dresser blade.
Figure 15:
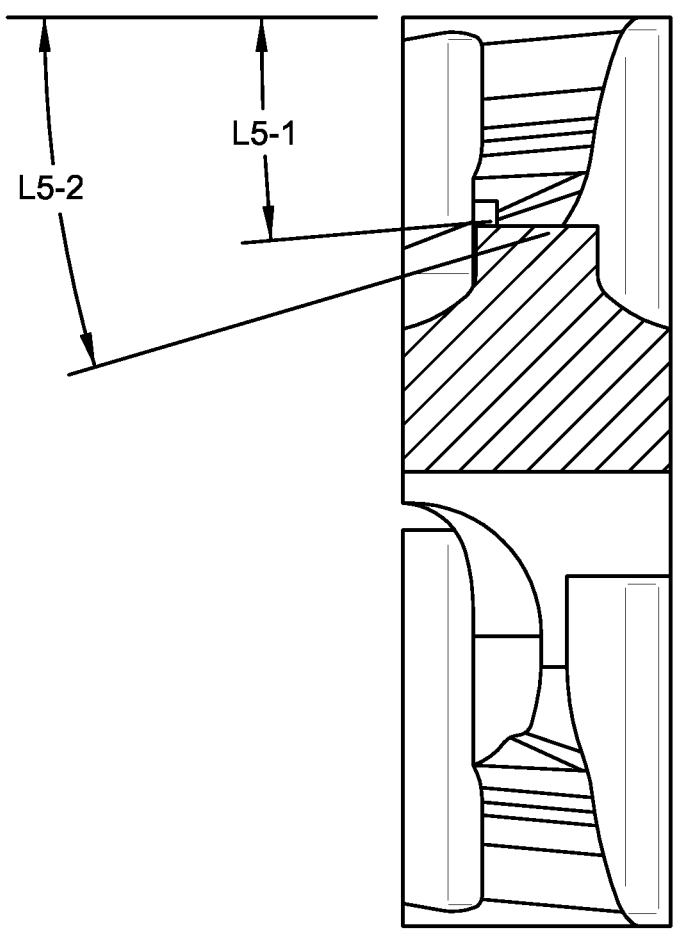
FIG. 15 is a section view of the embodiment of FIG. 10 of a tip dresser blade.
Figure 16:
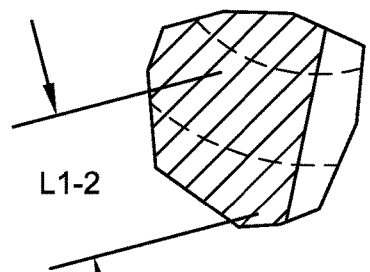
FIG. 16 is a detail view of the embodiment of FIG. 10 of a tip dresser blade.
Figure 17:
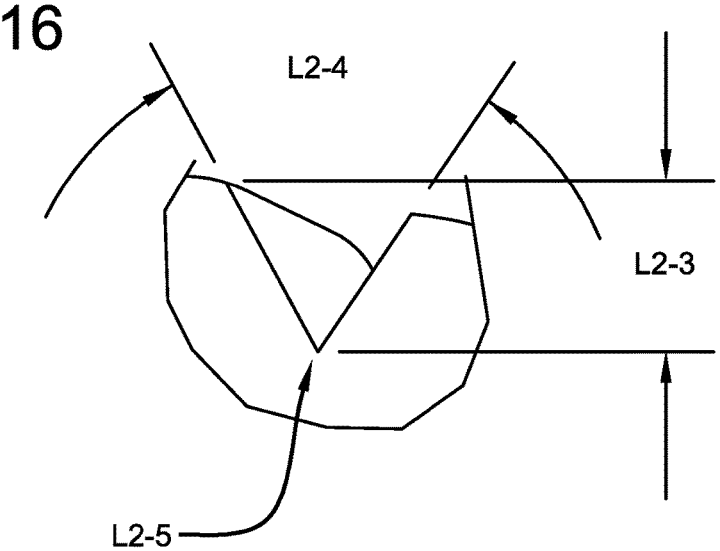
FIG. 17 is a detail view of the embodiment of FIG. 10 of a tip dresser blade.
Figure 18:
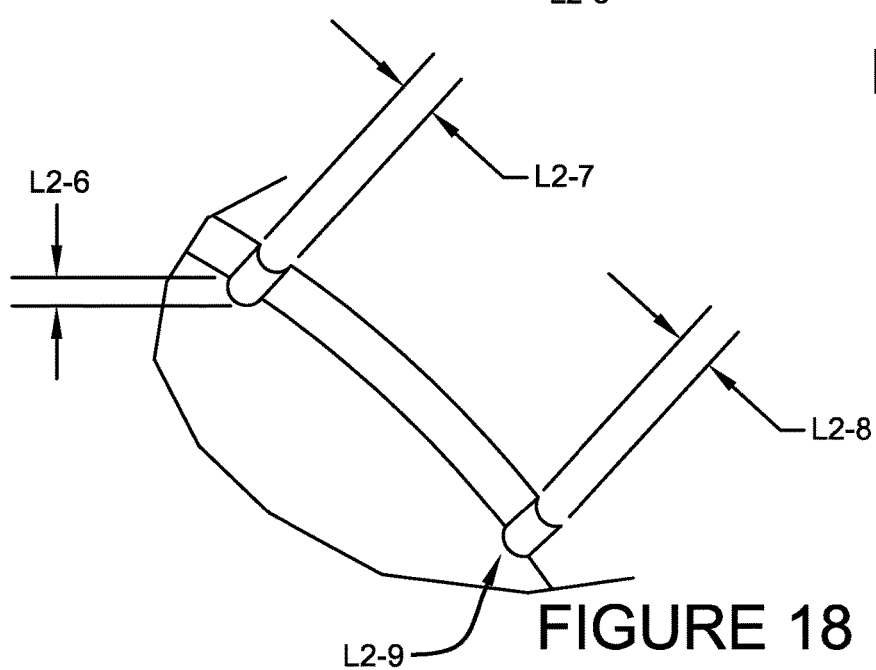
FIG. 18 is a detail view of the embodiment of FIG. 10 of a tip dresser blade.
Figure 19:
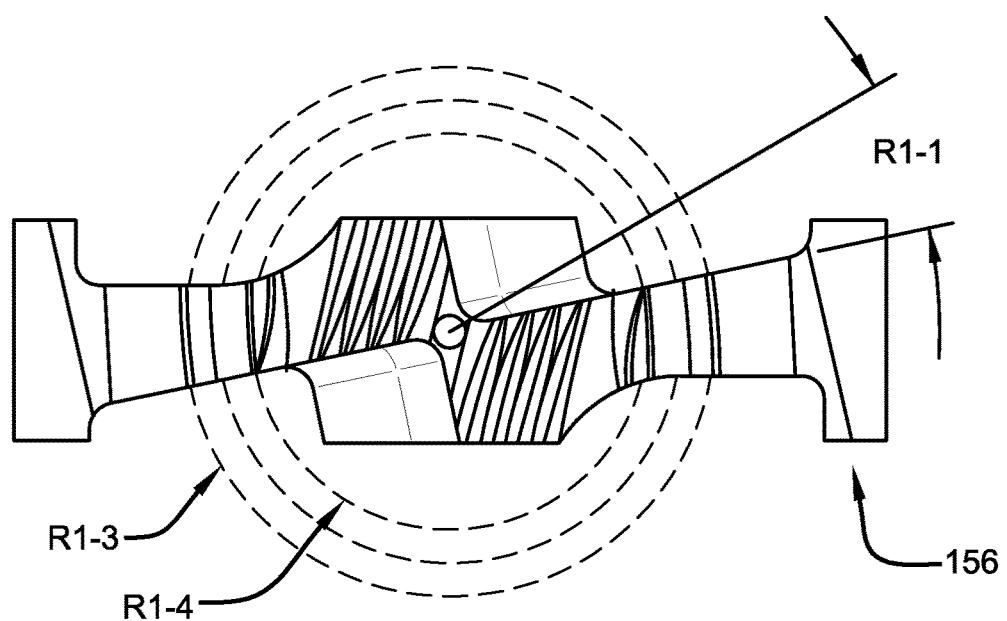
FIG. 19 is a top view of another embodiment of a tip dresser blade.
Figure 20:
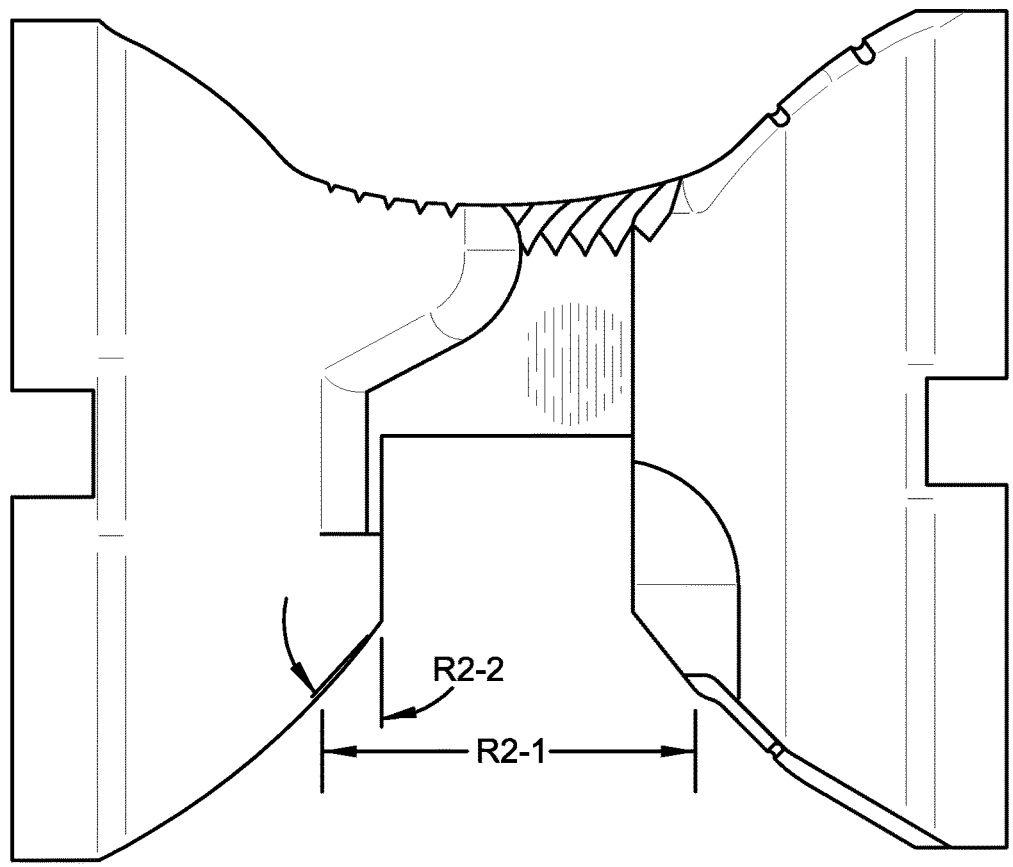
FIG. 20 is a front view of the embodiment of FIG. 19 of a tip dresser blade.
Figure 21:
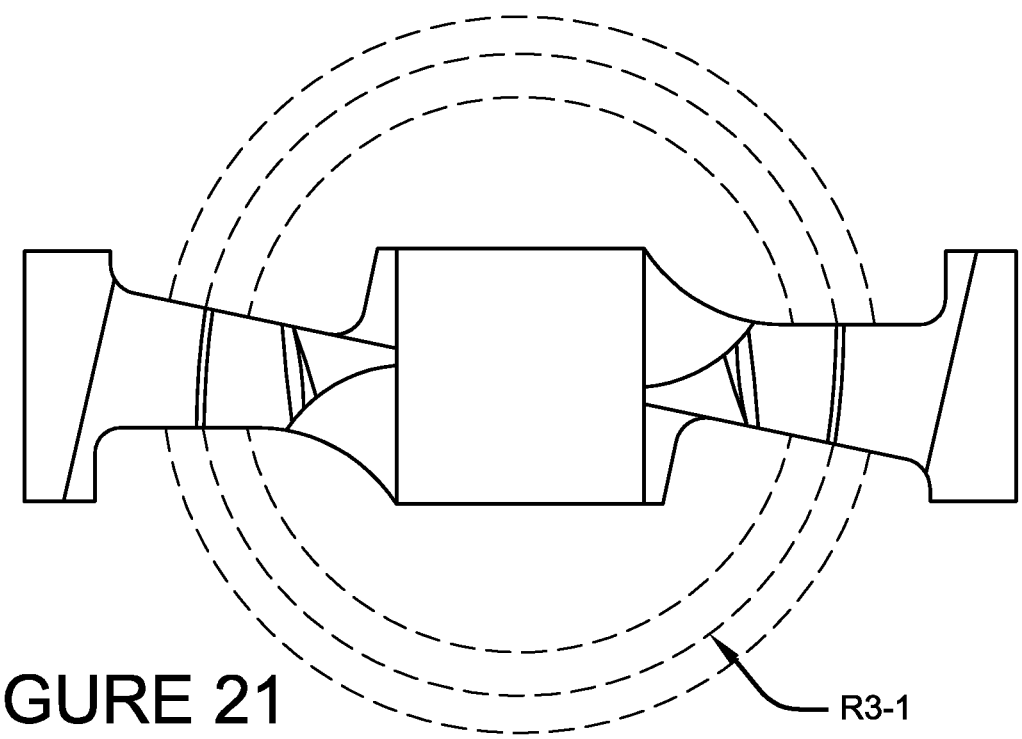
FIG. 21 is a bottom view of the embodiment of FIG. 19 of a tip dresser blade.
Figure 22:
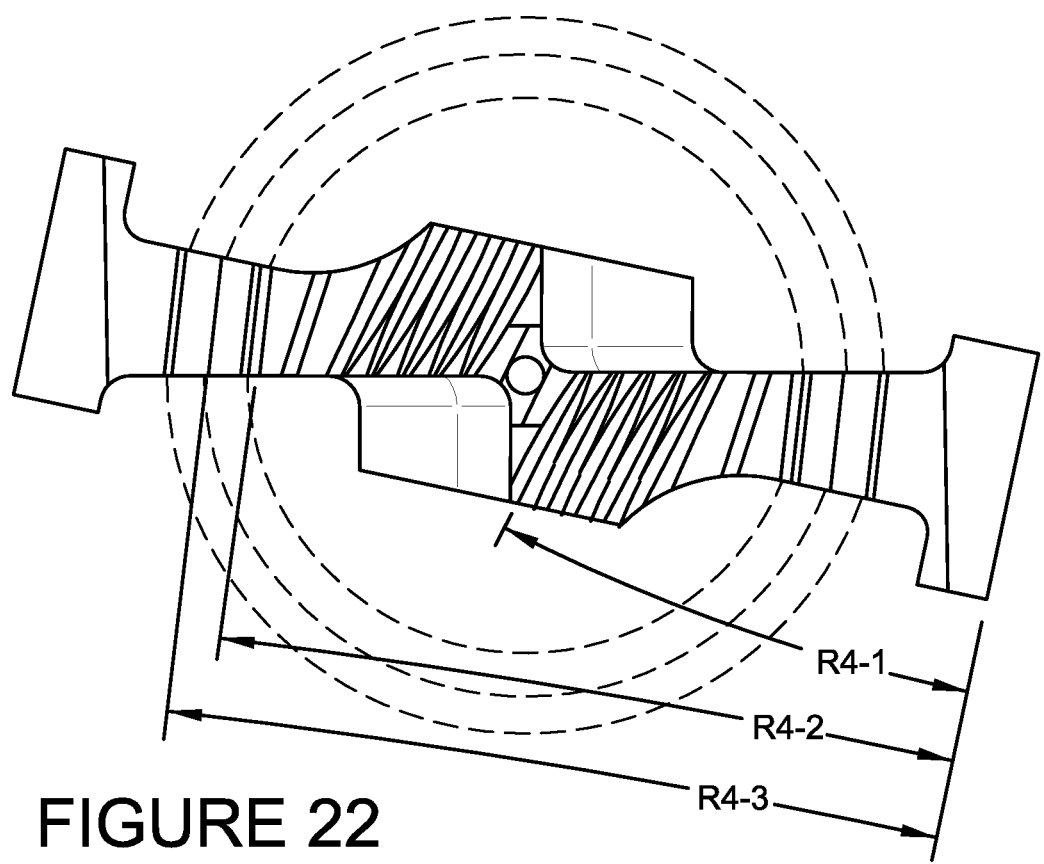
FIG. 22 is a top view of the embodiment of FIG. 19 of a tip dresser blade.
Figure 23:
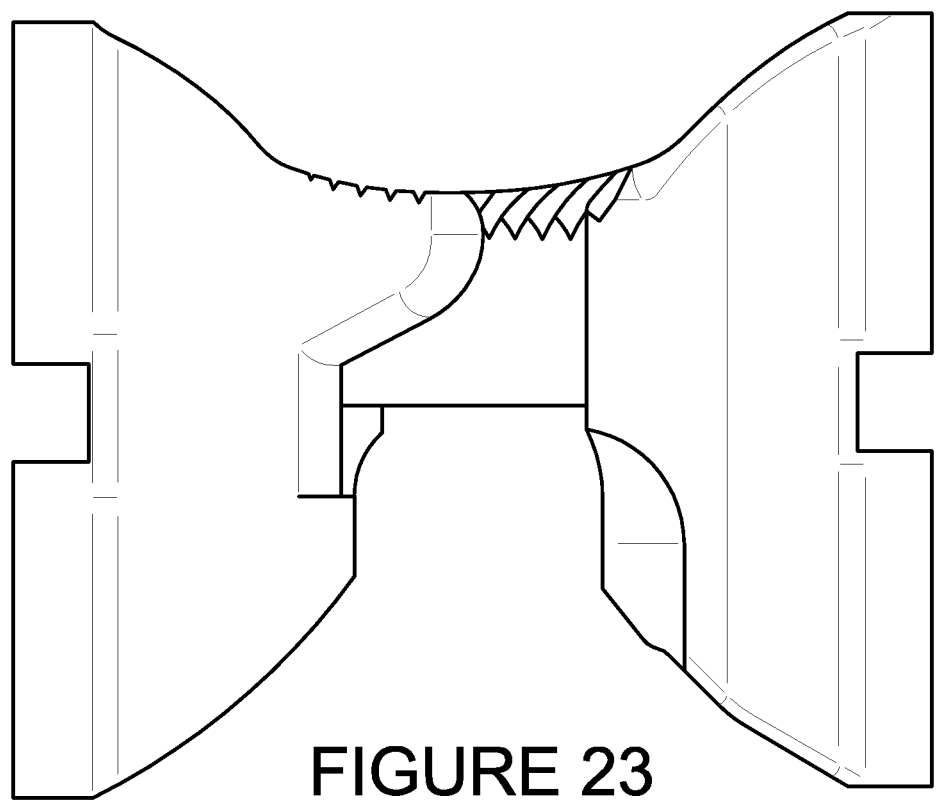
FIG. 23 is a profile view of the embodiment of FIG. 19 of a tip dresser blade.
Figure 24:
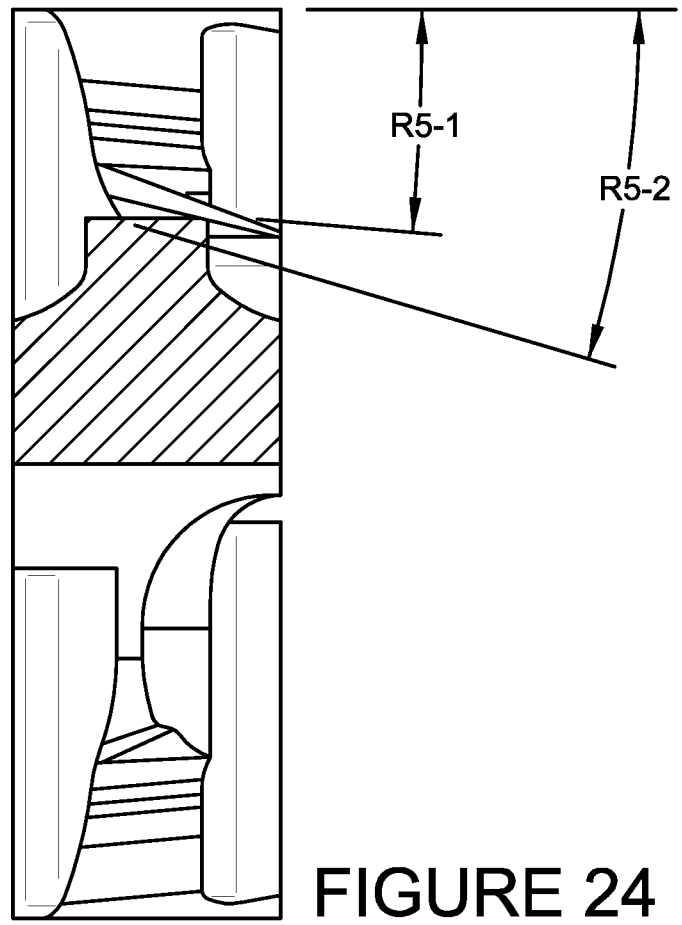
FIG. 24 is a section view of the embodiment of FIG. 19 of a tip dresser blade.
Figure 25:
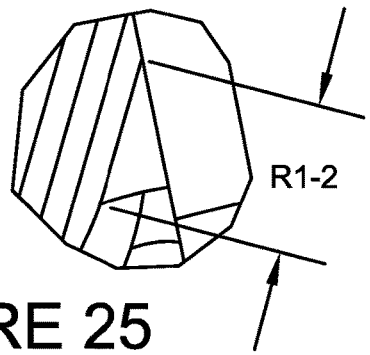
FIG. 25 is a detail view of the embodiment of FIG. 19 of a tip dresser blade.
Figure 26:
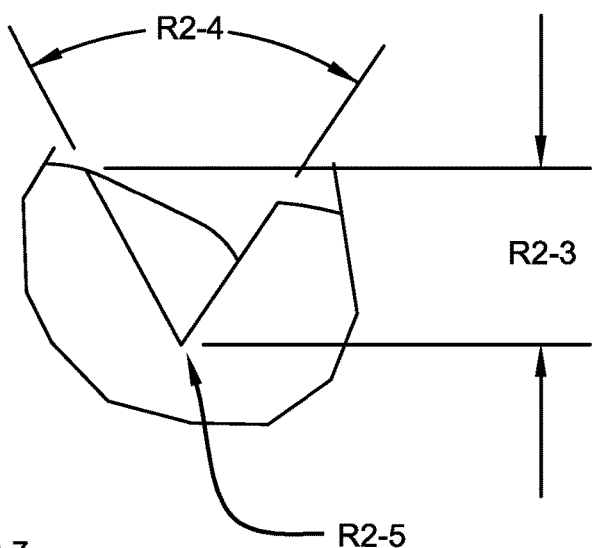
FIG. 26 is a detail view of the embodiment of FIG. 19 of a tip dresser blade.
Figure 27:
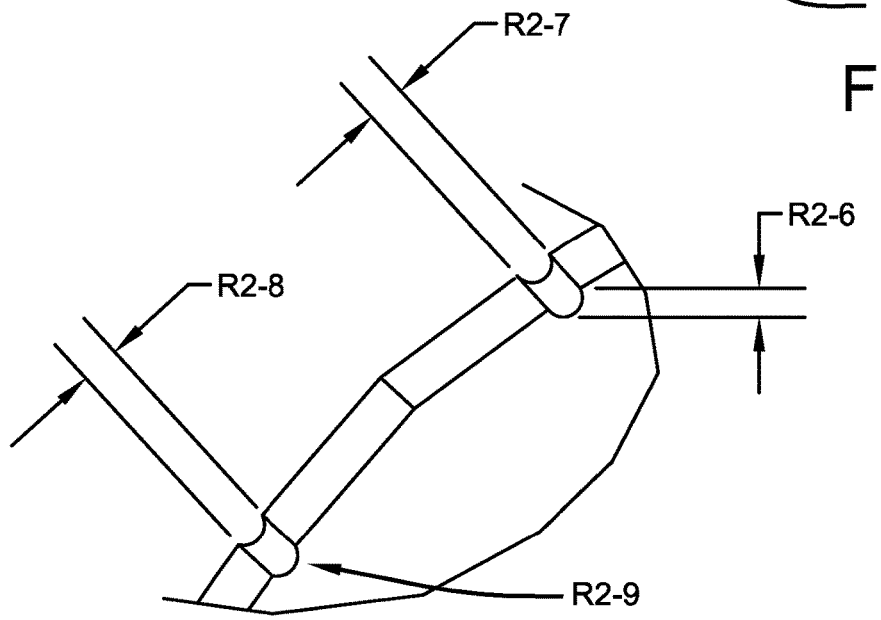
FIG. 27 is a detail view of the embodiment of FIG. 19 of a tip dresser blade.
Figure 28:
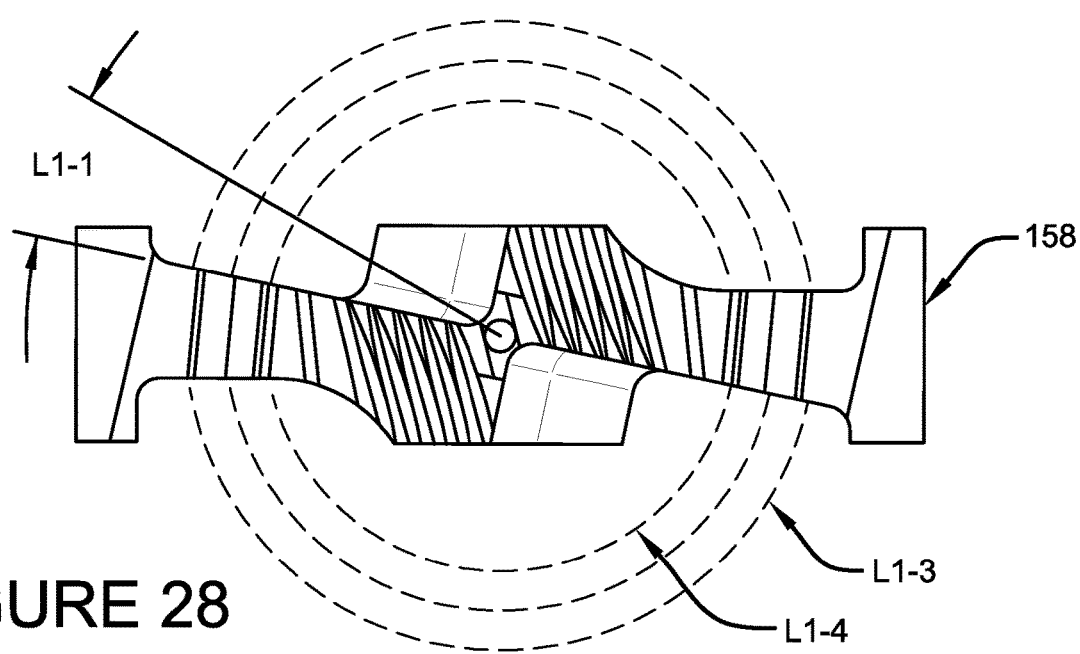
FIG. 28 is a top view of another embodiment of a tip dresser blade.
Figure 29:
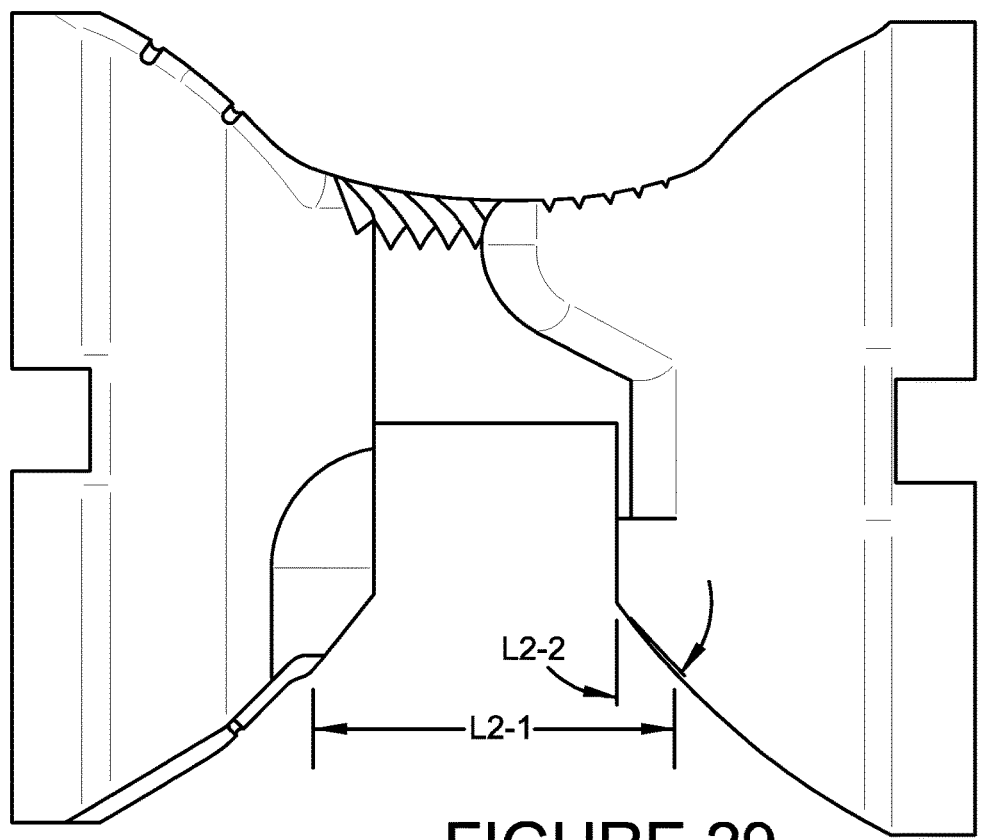
FIG. 29 is a front view of the embodiment of FIG. 28 of a tip dresser blade.
Figure 30:
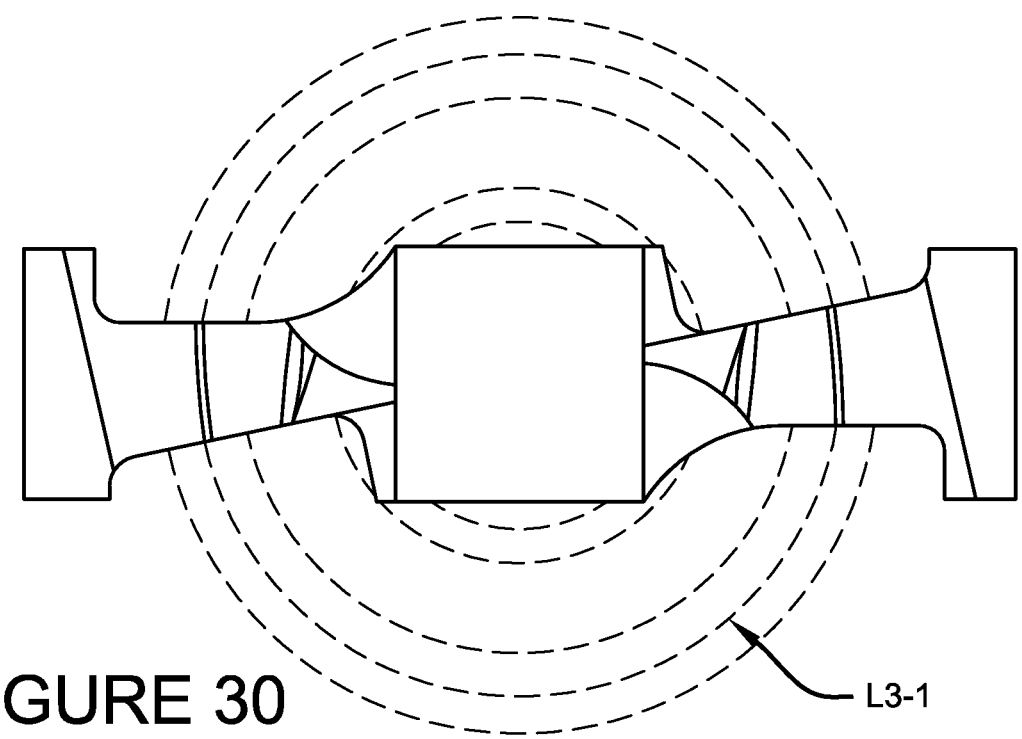
FIG. 30 is a bottom view of the embodiment of FIG. 28 of a tip dresser blade.
Figure 31:
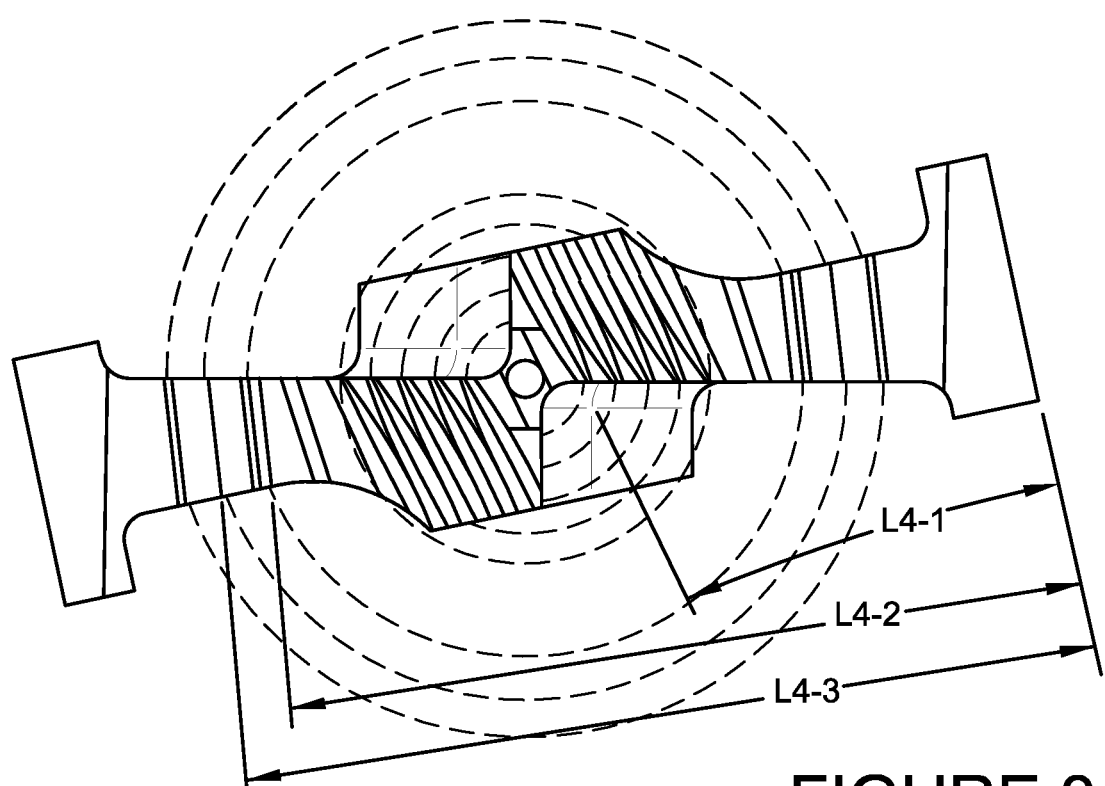
FIG. 31 is a top view of the embodiment of FIG. 28 of a tip dresser blade.
Figure 32:
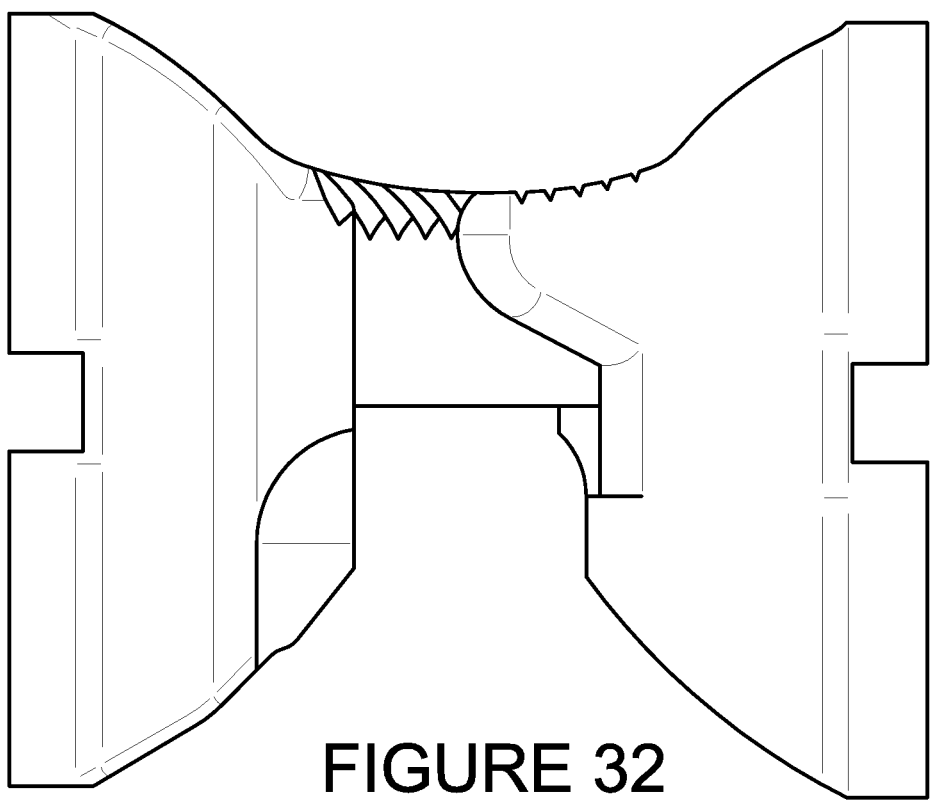
FIG. 32 is a profile view of the embodiment of FIG. 28 of a tip dresser blade.
Figure 33:
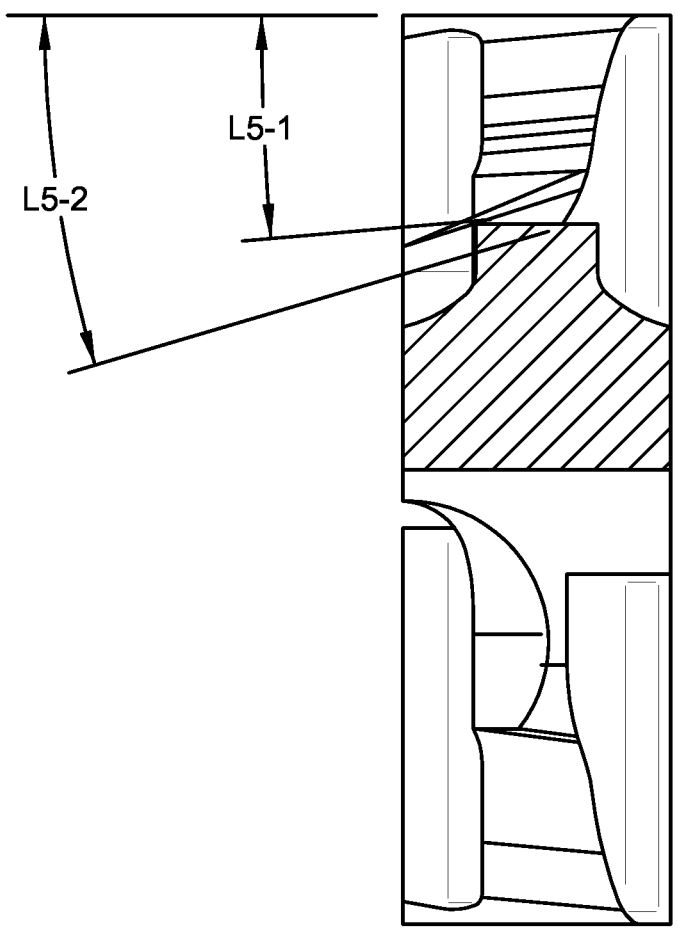
FIG. 33 is a section view of the embodiment of FIG. 28 of a tip dresser blade.
Figure 34:
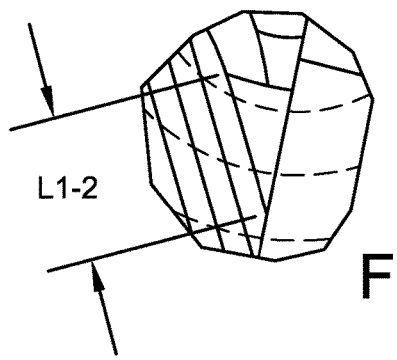
FIG. 34 is a detail view of the embodiment of FIG. 28 of a tip dresser blade.
Figure 35:
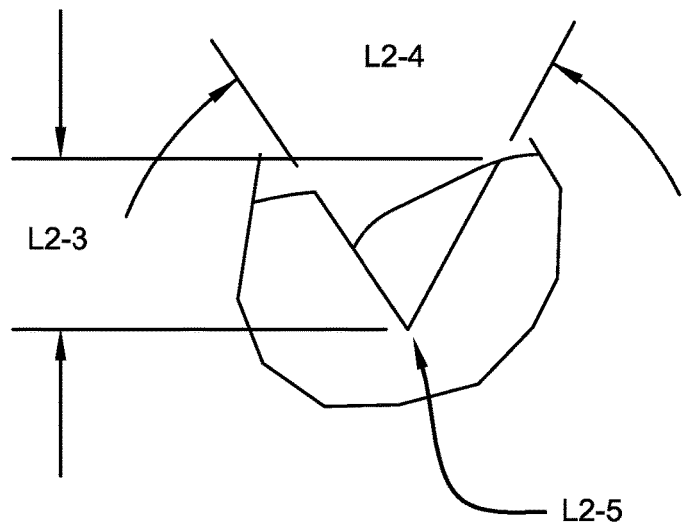
FIG. 35 is a detail view of the embodiment of FIG. 28 of a tip dresser blade.
Figure 36:
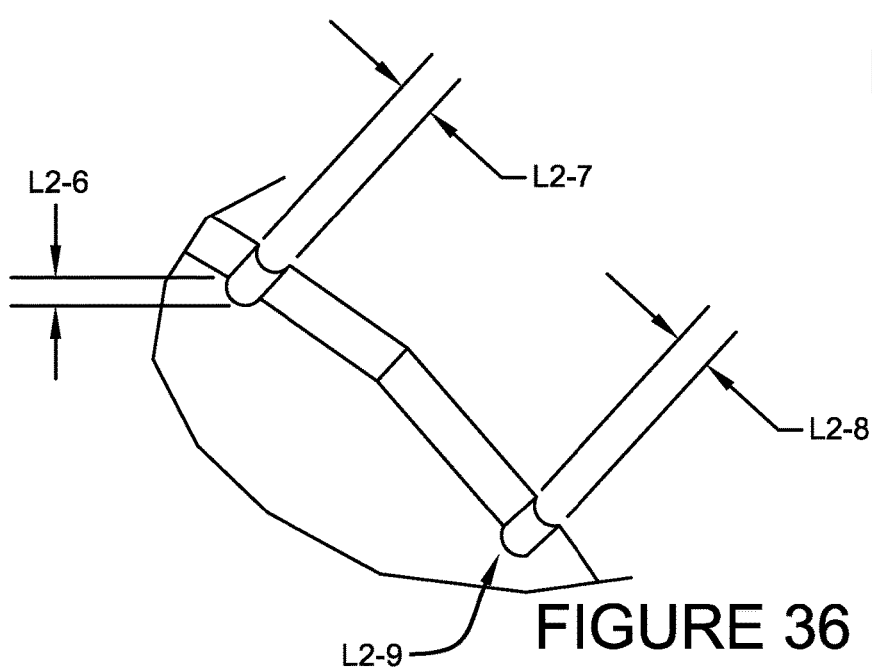
FIG. 36 is a detail view of the embodiment of FIG. 28 of a tip dresser blade.
Figure 37:
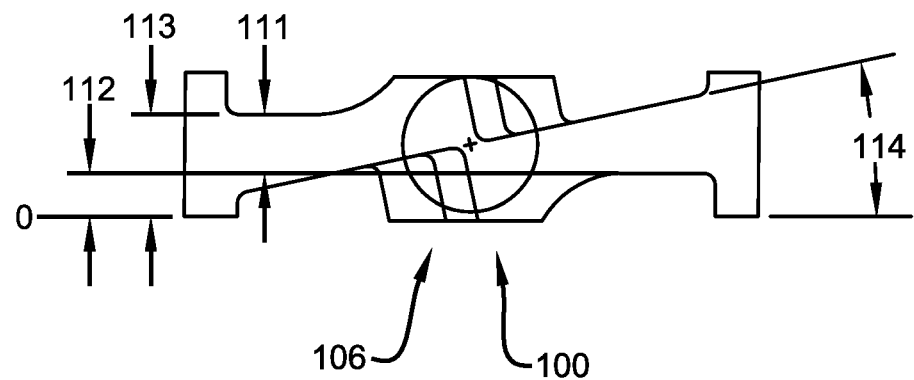
FIG. 37 is a top view of one embodiment of a tip dresser blade blank.
Figure 38:
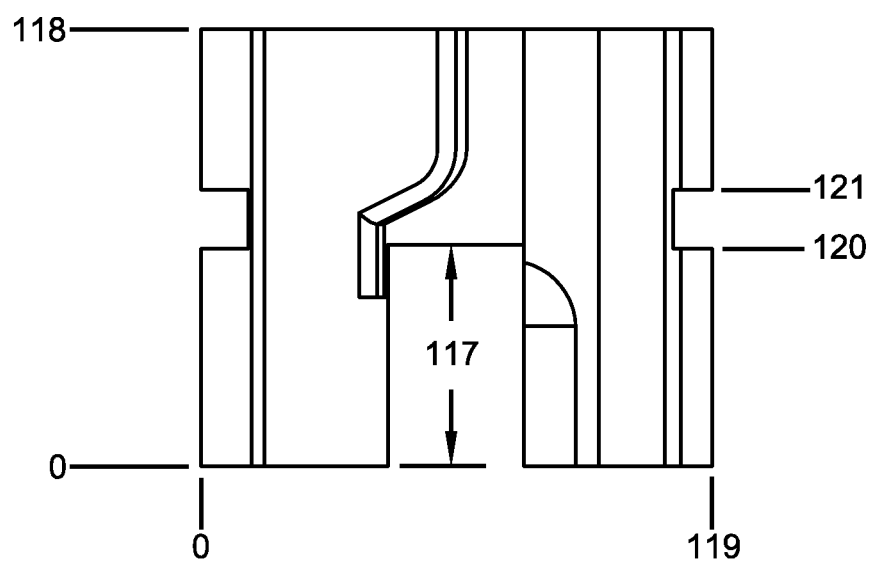
FIG. 38 is a front view of the embodiment of FIG. 37 of a tip dresser blade blank.
Figure 39:
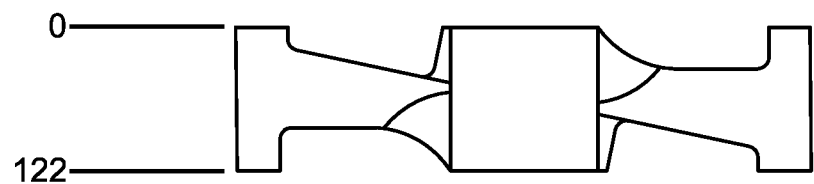
FIG. 39 is a bottom view of the embodiment of FIG. 37 of a tip dresser blade blank.
Figure 40:
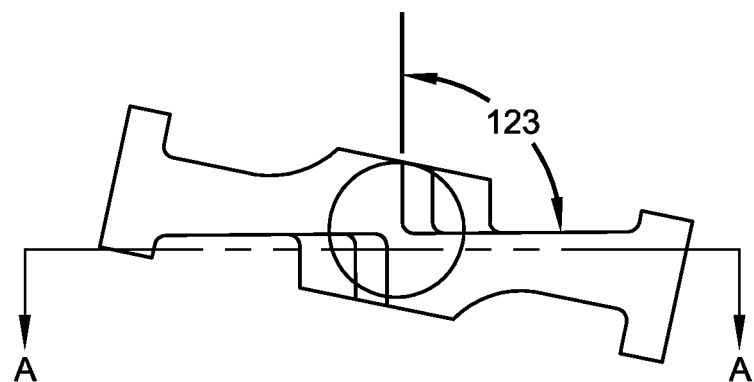
FIG. 40 is a top view of the embodiment of FIG. 37 of a tip dresser blade blank.
Figure 41:
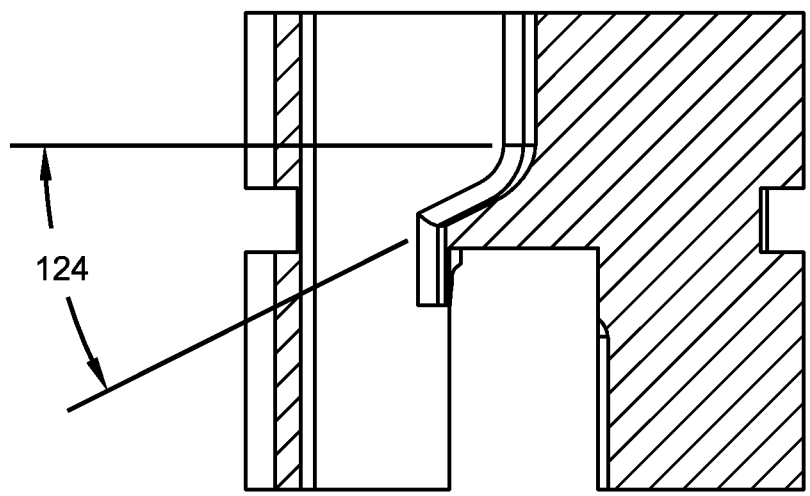
FIG. 41 is a section view of the embodiment of FIG. 37 of a tip dresser blade blank.
Figure 42:
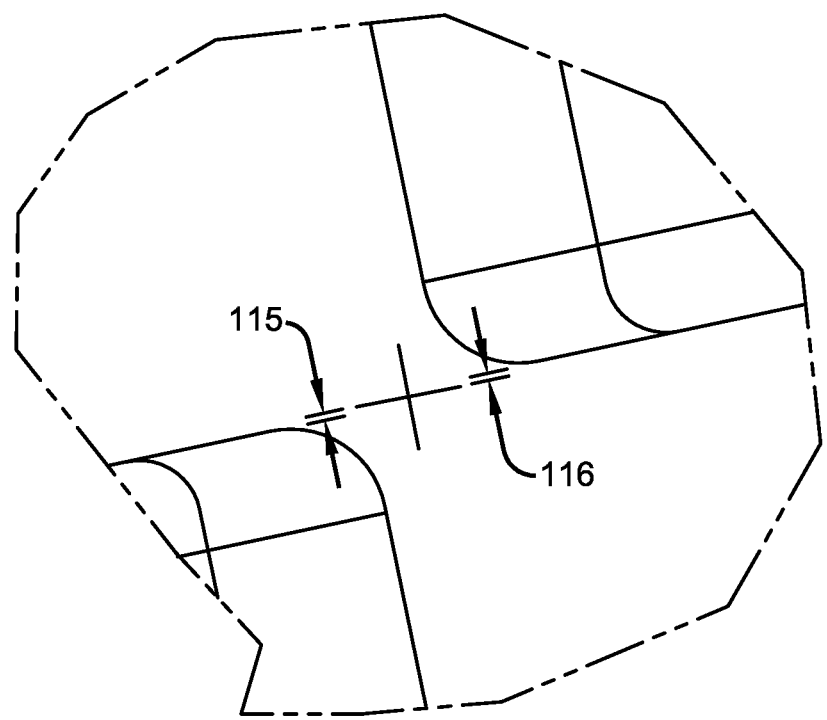
FIG. 42 is a detail view of the embodiment of FIG. 37 of a tip dresser blade blank.
Figure 43:
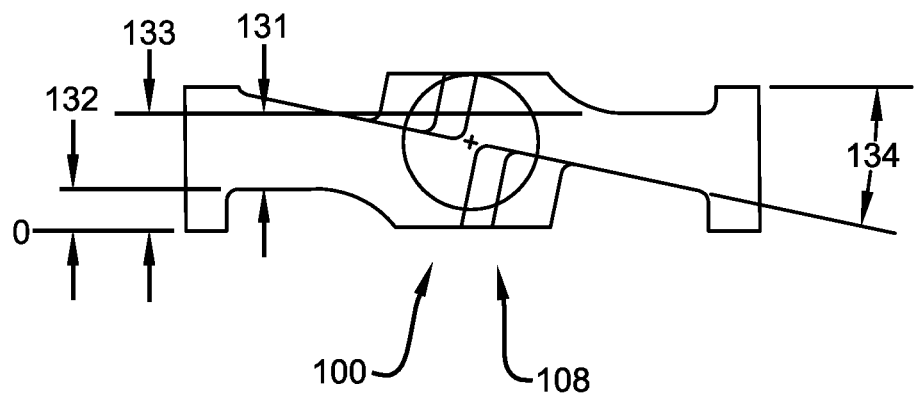
FIG. 43 is a top view of second embodiment of a tip dresser blade blank.
Figure 44:
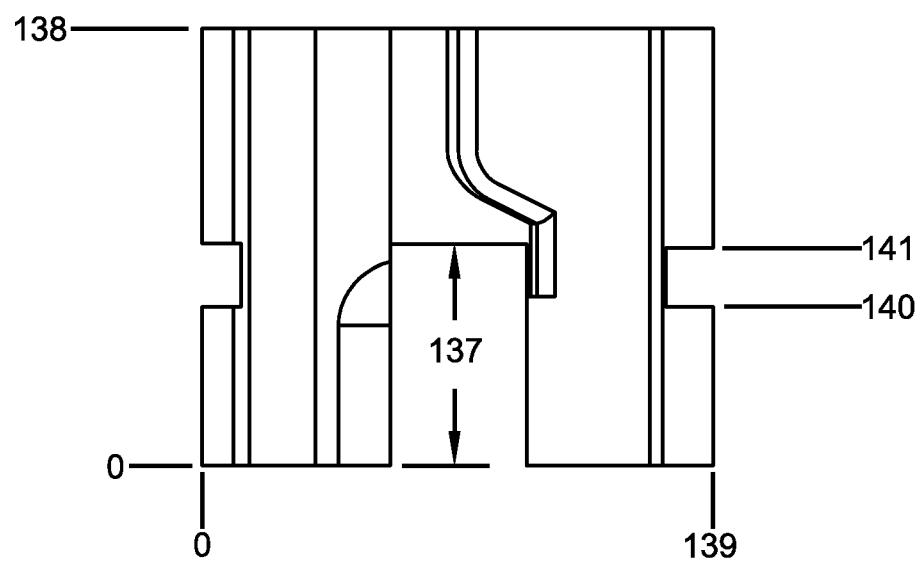
FIG. 44 is a front view of the embodiment of FIG. 43 of a tip dresser blade blank.
Figure 45:
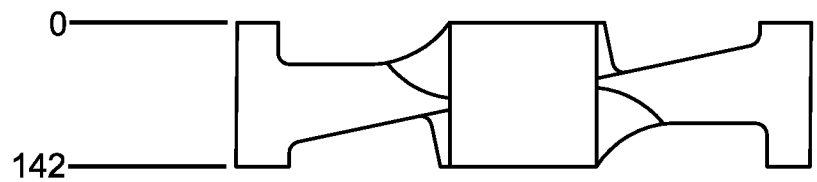
FIG. 45 is a bottom view of the embodiment of FIG. 43 of a tip dresser blade blank.
Figure 46:
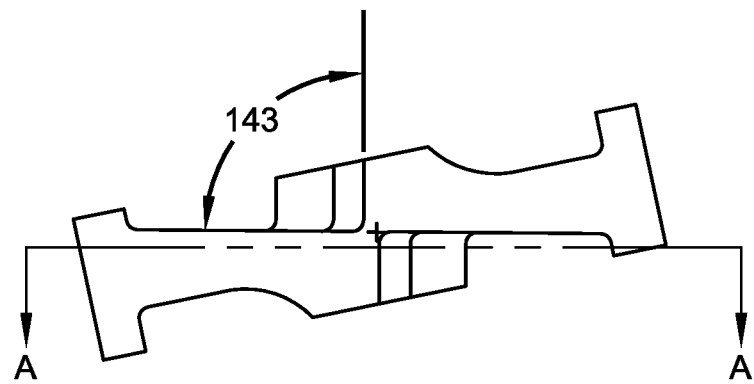
FIG. 46 is a top view of the embodiment of FIG. 43 of a tip dresser blade blank.
Figure 47:
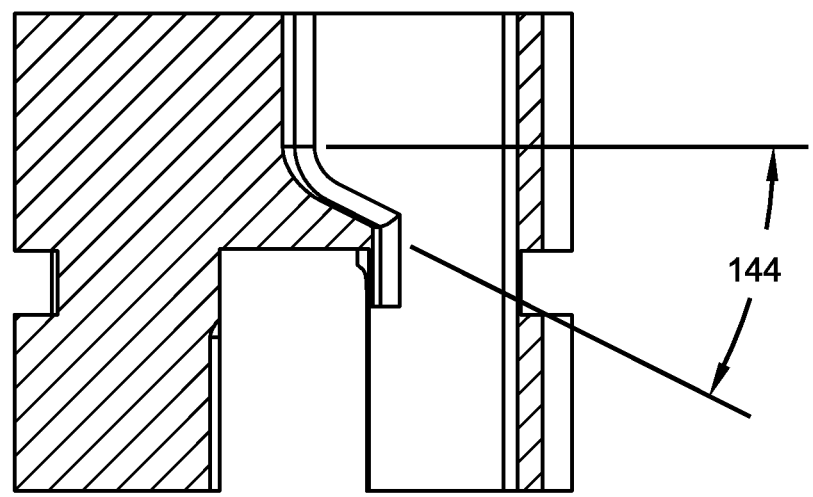
FIG. 47 is a section view of the embodiment of FIG. 43 of a tip dresser blade blank.
Figure 48:
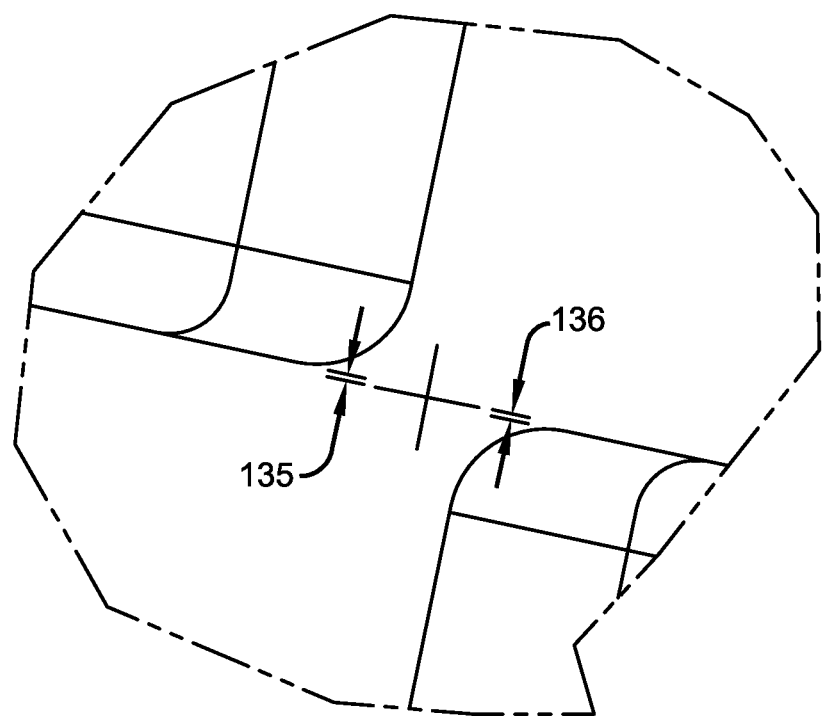
FIG. 48 is a detail view of the embodiment of FIG. 43 of a tip dresser blade blank.

The body 100 may be ground to provide the desired geometry. A first non-limiting embodiment of a tip dress blade 152 is shown in FIGS. 1-9. A second non-limiting embodiment of a tip dress blade 154 is shown in FIGS. 10-18. A third non-limiting embodiment of a tip dress blade 156 is shown in FIGS. 19-27. A fourth non-limiting embodiment of a tip dress blade 158 is shown in FIGS. 28-36. Without limitation each of the non-limiting embodiments of a tip dress blade 152, 154, 156, 158 may be ground from a tip dresser blade blank 106, 108 such as, without limitation, one of the tip dresser blade blanks 106, 108 shown in FIGS. 37-48. Without limitation, the tip dress blade 152 and the tip dress blade 154 may be mirror images of one another differing primarily, but not necessarily solely, in chirality, where the tip dress blade 152 may be the right-hand version, and the tip dress blade 154 may be the left-hand version. Without limitation, the tip dress blade 156 and the tip dress blade 158 may be mirror images of one another differing primarily, but not necessarily solely, in chirality, where the tip dress blade 156 may be the right-hand version, and the tip dress blade 158 may be the left-hand version. The mirror image embodiments may be adapted for use as the matched top and bottom blades in a tip dress device.

In the first non-limiting embodiment of a tip dresser blade blank 106 shown in FIGS. 37-42, the tip dresser blade blank 106 has a web width 111 in the range of 0.25 mm to 3.00 mm, inclusive; a blade depth 112 in the range of 1.00 mm to 3.00 mm, inclusive; a blade depth 113 in the range of 2.30 mm to 6.30 mm, inclusive; a Profile Angle 114 in the range of 2 degrees to 35 degrees, inclusive; a Cutting Edge 115 in the range of 0.010 mm to 0.035 mm, inclusive; a Cutting Edge 116 in the range of 0.010 mm to 0.035 mm, inclusive; a Slot Height 117 in the range of 8.70 mm to 12.70 mm, inclusive; a Blade Height 118 in the range of 16.50 mm to 26.50 mm, inclusive; a Blade Width 119 in the range of 20.50 mm to 35.50 mm, inclusive; a Notch Height 120 in the range of 5.70 mm to 15.70 mm, inclusive; a Notch Height 121 in the range of 8.50 mm to 18.50 mm, inclusive; a Blade Depth 122 in the range of 4.30 mm to 8.3 0 mm, inclusive; a Profile Angle 123 in the range of 2 degrees to 115 degrees, inclusive; and a Relief Angle 124 in the range of 2 degrees to 50 degrees, inclusive.

In the second non-limiting embodiment of a tip dresser blade blank 108 shown in FIGS. 43-48, the tip dresser blade blank 108 has a web width 131 in the range of 0.25 mm to 3.00 mm, inclusive; a blade depth 132 in the range of 1.00 mm to 3.00 mm, inclusive; a blade depth 133 in the range of 2.30 mm to 6.30 mm, inclusive; a Profile Angle 134 in the range of 2 degrees to 35 degrees, inclusive; a Cutting Edge 135 in the range of 0.010 mm to 0.035 mm, inclusive; a Cutting Edge 136 in the range of 0.010 mm to 0.035 mm, inclusive; a Slot Height 137 in the range of 8.70 mm to 12.70 mm, inclusive; a Blade Height 138 in the range of 16.50 mm to 26.50 mm, inclusive; a Blade Width 139 in the range of 20.50 mm to 20.5 mm, inclusive; a Notch Height 140 in the range of 2.90 mm to 12.90 mm, inclusive; a Notch Height 141 in the range of 5.70 mm to 15.70 mm, inclusive; a Blade Depth 142 in the range of 4.30 mm to 8.30 mm, inclusive; a Profile Angle 143 in the range of 2 degrees to 115 degrees, inclusive; a Relief Angle 144 in the range of 2 degrees to 50 degrees, inclusive.

The tip dress blade blank 106, 108 may be further ground to provide cutting surface features adapted to mill or otherwise cut away material from an associated electrode during a tip dress operation. Tip dress blade 152 may be formed by further grinding tip dress blade blank 106 to form the features shown in FIGS. 1-9. Tip dress blade 154 may be formed by further grinding tip dress blade blank 108 to form the features shown in FIGS. 10-18. Tip dress blade 156 may be formed by further grinding tip dress blade blank 106 to form the features shown in FIGS. 19-27. Tip dress blade 158 may be formed by further grinding tip dress blade blank 108 to form the features shown in FIGS. 28-36.

The first tip dress blade 152 may have an R1-1 Drill Point Angle in the range of 0 degrees to 35 degrees, inclusive; an R1-2 Relief Angle in the range of 0 degrees to 35 degrees, inclusive; an R1-3 Chip Breaker Diameter in the range of 9.00 mm to 13.00 mm, inclusive; an R1-4 Chip Breaker Diameter in the range of 13.00 mm to 17.00 mm, inclusive; an R2-1 Relief Dimension in the range of 7.00 mm to 12.00 mm, inclusive; an R2-2 Relief Angle in the range of 2 degrees to 85 degrees, inclusive; an R2-3 Groove Depth in the range of 0.20 mm to 0.40 mm, inclusive; an R2-4 Groove Angle in the range of 2 degrees to 85 degrees, inclusive; an R2-5 Groove Radius in the range of 0.177 mm to 0.203 mm, inclusive; an R2-6 Chip Cutter in the range of 10.010 mm to 0.350 mm, inclusive; an R2-7 Chip Cutter in the range of 20.010 mm to 0.500 mm, inclusive; an R2-8 Chip Cutter in the range of 0.010 mm to 0.450 mm, inclusive; an R2-9 Chip Cutter Radius in the range of 0.010 mm to 0.025 mm, inclusive; an R3-1 Chip Breaker Diameter in the range of 11.00 mm to 15.00 mm, inclusive; an R4-1 Groove Turn Angle in the range of 0 degrees to 35 degrees, inclusive; an R4-2 Stage 1 Turn Angle in the range of 0 degrees to 35 degrees, inclusive; an R5-1 Tip Angle in the range of 0 degrees to 35 degrees, inclusive; and an R5-2 Groove Tip Angle in the range of 0 degrees to 35 degrees, inclusive.

The second tip dress blade 154 may have an L1-1 Drill Point Angle in the range of 0 degrees to 35 degrees, inclusive; an L1-2 Relief Angle in the range of 0 degrees to 35 degrees, inclusive; an L1-3 Chip Breaker Diameter in the range of 9.00 mm to 13.00 mm, inclusive; an L1-4 Chip Breaker Diameter in the range of 13.00 mm to 17.00 mm, inclusive; an L2-1 Relief Dimension in the range of 9.00 mm to 12.00 mm, inclusive; an L2-2 Relief Angle in the range of 2 degrees to 85 degrees, inclusive; an L2-3 Groove Depth in the range of 0.20 mm to 0.40 mm, inclusive; an L2-4 Groove Angle in the range of 2 degrees to 85 degrees, inclusive; an L2-5 Groove Radius in the range of 0.177 mm to 0.203 mm, inclusive; an L2-6 Chip Cutter in the range of 10.010 mm to 0.350 mm, inclusive; an L2-7 Chip Cutter in the range of 20.010 mm to 0.500 mm, inclusive; an L2-8 Chip Cutter in the range of 30.010 mm to 0.450 mm, inclusive; an L2-9 Chip Cutter Radius in the range of 0.010 mm to 0.025 mm, inclusive; an L3-1 Chip Breaker Diameter in the range of 11.00 mm to 15.00 mm, inclusive; an L4-1 Groove Turn Angle in the range of 0 degrees to 35 degrees, inclusive; an L4-2 Stage 1 Turn Angle in the range of 0 degrees to 35 degrees, inclusive; an L5-1 Tip Angle in the range of 0 degrees to 35 degrees, inclusive; and an L5-2 Groove Tip Angle in the range of 0 degrees to 35 degrees, inclusive.

The third tip dress blade 156 may have an R1-1 Drill Point Angle in the range of 0 degrees to 35 degrees, inclusive; an R1-2 Relief Angle in the range of 0 degrees to 35 degrees, inclusive; an R1-3 Chip Breaker Diameter in the range of 10.00 mm to 16.00 mm, inclusive; an R1-4 Chip Breaker Diameter in the range of 16.00 mm to 20.00 mm, inclusive; an R2-1 Relief Dimension in the range of 9.00 mm to 13.00 mm, inclusive; an R2-2 Relief Angle in the range of 2 degrees to 85 degrees, inclusive; an R2-3 Groove Depth in the range of 0.20 mm to 0.40 mm, inclusive; an R2-4 Groove Angle in the range of 2 degrees to 85 degrees, inclusive; an R2-5 Groove Radius in the range of 0.177 mm to 0.203 mm, inclusive; an R2-6 Chip Cutter in the range of 0.010 mm to 0.350 mm, inclusive; an R2-7 Chip Cutter in the range of 0.010 mm to 0.500 mm, inclusive; an R2-8 Chip Cutter in the range of 0.010 mm to 0.450 mm, inclusive; an R2-9 Chip Cutter Radius in the range of 0.010 mm to 0.025 mm, inclusive; an R3-1 Chip Breaker Diameter in the range of 14.00 mm to 18.00 mm, inclusive; an R4-1 Groove Turn Angle in the range of 0 degrees to 35 degrees, inclusive; an R4-2 Stage 1 Turn Angle in the range of 0 degrees to 35 degrees, inclusive; an R4-3 Stage 2 Turn Angle in the range of 0 degrees to 35 degrees, inclusive; an R5-1 Tip Angle in the range of 0 degrees to 35 degrees, inclusive; and an R5-2 Groove Tip Angle in the range of 0 degrees to 35 degrees, inclusive.

The fourth tip dress blade 158 may have an L1-1 Drill Point Angle in the range of 0 degrees to 35 degrees, inclusive; an L1-2 Relief Angle in the range of 0 degrees to 35 degrees, inclusive; an L1-3 Chip Breaker Diameter in the range of 10.00 mm to 16.00 mm, inclusive; an L1-4 Chip Breaker Diameter in the range of 16.00 mm to 20.00 mm, inclusive; an L2-1 Relief Dimension in the range of 9.00 mm to 13.00 mm, inclusive; an L2-2 Relief Angle in the range of 2 degrees to 85 degrees, inclusive; an L2-3 Groove Depth in the range of 0.20 mm to 0.40 mm, inclusive; an L2-4 Groove Angle in the range of 2 degrees to 85 degrees, inclusive; an L2-5 Groove Radius in the range of 0.177 mm to 0.203 mm, inclusive; an L2-6 Chip Cutter in the range of 0.010 mm to 0.350 mm, inclusive; an L2-7 Chip Cutter in the range of 0.010 mm to 0.500 mm, inclusive; an L2-8 Chip Cutter in the range of 0.010 mm to 0.450 mm, inclusive; an L2-9 Chip Cutter Radius in the range of 0.010 mm to 0.025 mm, inclusive; an L3-1 Chip Breaker Diameter in the range of 14.00 mm to 18.00 mm, inclusive; an L4-1 Groove Turn Angle in the range of 0 degrees to 35 degrees, inclusive; an L4-2 Stage 1 Turn Angle in the range of 0 degrees to 35 degrees, inclusive; an L4-3 Stage 2 Turn Angle in the range of 0 degrees to 35 degrees, inclusive; an L5-1 Tip Angle in the range of 0 degrees to 35 degrees, inclusive; and an L5-2 Groove Tip Angle in the range of 0 degrees to 35 degrees, inclusive.

The provided tip dress blades 152, 154, 156, 158 are of interest as the material and geometry are adapted to provide exceptional performance and service life relative to the state of the art. The tip dress blades 152, 154, 156, 158 have been found to provide a suitable tip dress in half the time of state of the art tip dress blades. The tip dress blades 152, 154, 156, 158 made from tip dress blade blanks 106, 1085 have been found to have a service life twice that of state of the art tip dress blades.

Provided in TABLE I is a set of test results from tip dressing using tip dress blades made to conform to the present subject matter provided herein. The testing was performed on a servo robot and weld gun. The table shows two sets of columns, each pair of columns having a CUT column and an AMP column. The units for columns headed by CUT are in millimeters of material removed from the tested tip of an SQ style tip dress blade. The units from columns headed by Amp is Amperage drawn on a 1 horsepower electrical motor. The first pair of columns is for testing done on a Lot Code 17 tip dress blade. The second pair of columns, headed Reference Cutter, is for testing done on a Lot Code 15 tip dress blade. Expert estimates based on the data are a 27% increase in the life of the welding tip using the Lot Code 17 tip dress blade over that of the Lot Code 15 tip dress blade. As tested the Lot Code 17 tip dress blade is a tip dress blade using the subject matter provided herein and set forth in at least one of the Clauses herebelow, while the Lot Code 15 cutter is a conventional tip dress blade. It should be understood that providing a tip dress blade that maintains acceptable weld quality while extending weld tip life by 27% represents a very substantial improvement over the conventional art.

TABLE I

|  | Cut | Amp | Reference Cutter Cut | Amp |
|---|---|---|---|---|
| Pre-Dress | 0.93 | 4.0 | 1.16 | 3.7 |
| Dress #01 | 0.11 | 4.7 | 0.14 | 4.1 |
| Dress #02 | 0.08 | 4.4 | 0.12 | 4.3 |
| Dress #03 | 0.09 | 4.5 | 0.11 | 4.4 |
| Dress #04 | 0.06 | 4.4 | 0.11 | 4.5 |
| Dress #05 | 0.08 | 4.4 | 0.11 | 4.5 |
| Dress #06 | 0.06 | 4.4 | 0.09 | 4.5 |
| Dress #07 | 0.08 | 4.4 | 0.10 | 4.5 |
| Dress #08 | 0.08 | 4.4 | 0.10 | 4.3 |
| Dress #09 | 0.03 | 4.4 | 0.10 | 4.6 |
| Dress #10 | 0.09 | 4.6 | 0.10 | 4.7 |
| Dress #11 | 0.06 | 4.6 | 0.13 | 4.7 |
| Dress #12 | 0.07 | 4.5 | 0.10 | 4.6 |
| Dress #13 | 0.05 | 4.5 | 0.10 | 4.6 |
| Dress #14 | 0.07 | 4.7 | 0.11 | 4.4 |
| Dress #15 | 0.04 | 4.7 | 0.08 | 4.4 |
| Dress #16 | 0.06 | 4.7 | 0.13 | 4.8 |
| Dress #17 | 0.06 | 4.7 | 0.08 | 4.6 |
| Dress #18 | 0.05 | 4.7 | 0.12 | 4.6 |
| Dress #19 | 0.07 | 4.7 | 0.08 | 4.5 |
| Dress #20 | 0.06 | 4.7 | 0.10 | 4.8 |
| Total Removed | 2.28 |  | 3.27 |  |

Further examples consistent with the present subject matter are set out in the following numbered clauses.

Clause 1. A tip dresser blade comprising a body of M2 steel hardened to a Rockwell C hardness in the range of 63 to 66, inclusive, by double tempering; the body being ground to provide a geometry having an R1-1 Drill Point Angle in the range of 0 degrees to 35 degrees, inclusive; an R1-2 Relief Angle in the range of 0 degrees to 35 degrees, inclusive; an R1-3 Chip Breaker Diameter in the range of 9.00 mm to 13.00 mm, inclusive; an R1-4 Chip Breaker Diameter in the range of 13.00 mm to 17.00 mm, inclusive; an R2-1 Relief Dimension in the range of 7.00 mm to 12.00 mm, inclusive; an R2-2 Relief Angle in the range of 2 degrees to 85 degrees, inclusive; an R2-3 Groove Depth in the range of 0.20 mm to 0.40 mm, inclusive; an R2-4 Groove Angle in the range of 2 degrees to 85 degrees, inclusive; an R2-5 Groove Radius in the range of 0.177 mm to 0.203 mm, inclusive; an R2-6 Chip Cutter in the range of 10.010 mm to 0.350 mm, inclusive; an R2-7 Chip Cutter in the range of 20.010 mm to 0.500 mm, inclusive; an R2-8 Chip Cutter in the range of 0.010 mm to 0.450 mm, inclusive; an R2-9 Chip Cutter Radius in the range of 0.010 mm to 0.025 mm, inclusive; an R3-1 Chip Breaker Diameter in the range of 11.00 mm to 15.00 mm, inclusive; an R4-1 Groove Turn Angle in the range of 0 degrees to 35 degrees, inclusive; an R4-2 Stage 1 Turn Angle in the range of 0 degrees to 35 degrees, inclusive; an R5-1 Tip Angle in the range of 0 degrees to 35 degrees, inclusive; and an R5-2 Groove Tip Angle in the range of 0 degrees to 35 degrees, inclusive.

Clause 2. A tip dresser blade comprising a body of M2 steel hardened to a Rockwell C hardness in the range of 63 to 66, inclusive, by double tempering; the body being ground to provide a geometry having an L1-1 Drill Point Angle in the range of 0 degrees to 35 degrees, inclusive; an L1-2 Relief Angle in the range of 0 degrees to 35 degrees, inclusive; an L1-3 Chip Breaker Diameter in the range of 9.00 mm to 13.00 mm, inclusive; an L1-4 Chip Breaker Diameter in the range of 13.00 mm to 17.00 mm, inclusive; an L2-1 Relief Dimension in the range of 9.00 mm to 12.00 mm, inclusive; an L2-2 Relief Angle in the range of 2 degrees to 85 degrees, inclusive; an L2-3 Groove Depth in the range of 0.20 mm to 0.40 mm, inclusive; an L2-4 Groove Angle in the range of 2 degrees to 85 degrees, inclusive; an L2-5 Groove Radius in the range of 0.177 mm to 0.203 mm, inclusive; an L2-6 Chip Cutter in the range of 10.010 mm to 0.350 mm, inclusive; an L2-7 Chip Cutter in the range of 20.010 mm to 0.500 mm, inclusive; an L2-8 Chip Cutter in the range of 30.010 mm to 0.450 mm, inclusive; an L2-9 Chip Cutter Radius in the range of 0.010 mm to 0.025 mm, inclusive; an L3-1 Chip Breaker Diameter in the range of 11.00 mm to 15.00 mm, inclusive; an L4-1 Groove Turn Angle in the range of 0 degrees to 35 degrees, inclusive; an L4-2 Stage 1 Turn Angle in the range of 0 degrees to 35 degrees, inclusive; an L5-1 Tip Angle in the range of 0 degrees to 35 degrees, inclusive; and an L5-2 Groove Tip Angle in the range of 0 degrees to 35 degrees, inclusive.

Clause 3. A tip dresser blade comprising a body of M2 steel hardened to a Rockwell C hardness in the range of 63 to 66, inclusive, by double tempering; the body being ground to provide a geometry having an R1-1 Drill Point Angle in the range of 0 degrees to 35 degrees, inclusive; an R1-2 Relief Angle in the range of 0 degrees to 35 degrees, inclusive; an R1-3 Chip Breaker Diameter in the range of 10.00 mm to 16.00 mm, inclusive; an R1-4 Chip Breaker Diameter in the range of 16.00 mm to 20.00 mm, inclusive; an R2-1 Relief Dimension in the range of 9.00 mm to 13.00 mm, inclusive; an R2-2 Relief Angle in the range of 2 degrees to 85 degrees, inclusive; an R2-3 Groove Depth in the range of 0.20 mm to 0.40 mm, inclusive; an R2-4 Groove Angle in the range of 2 degrees to 85 degrees, inclusive; an R2-5 Groove Radius in the range of 0.177 mm to 0.203 mm, inclusive; an R2-6 Chip Cutter in the range of 0.010 mm to 0.350 mm, inclusive; an R2-7 Chip Cutter in the range of 0.010 mm to 0.500 mm, inclusive; an R2-8 Chip Cutter in the range of 0.010 mm to 0.450 mm, inclusive; an R2-9 Chip Cutter Radius in the range of 0.010 mm to 0.025 mm, inclusive; an R3-1 Chip Breaker Diameter in the range of 14.00 mm to 18.00 mm, inclusive; an R4-1 Groove Turn Angle in the range of 0 degrees to 35 degrees, inclusive; an R4-2 Stage 1 Turn Angle in the range of 0 degrees to 35 degrees, inclusive; an R4-3 Stage 2 Turn Angle in the range of 0 degrees to 35 degrees, inclusive; an R5-1 Tip Angle in the range of 0 degrees to 35 degrees, inclusive; and an R5-2 Groove Tip Angle in the range of 0 degrees to 35 degrees, inclusive.

Clause 4. A tip dresser blade comprising a body of M2 steel hardened to a Rockwell C hardness in the range of 63 to 66, inclusive, by double tempering; the body being ground to provide a geometry having an L1-1 Drill Point Angle in the range of 0 degrees to 35 degrees, inclusive; an L1-2 Relief Angle in the range of 0 degrees to 35 degrees, inclusive; an L1-3 Chip Breaker Diameter in the range of 10.00 mm to 16.00 mm, inclusive; an L1-4 Chip Breaker Diameter in the range of 16.00 mm to 20.00 mm, inclusive; an L2-1 Relief Dimension in the range of 9.00 mm to 13.00 mm, inclusive; an L2-2 Relief Angle in the range of 2 degrees to 85 degrees, inclusive; an L2-3 Groove Depth in the range of 0.20 mm to 0.40 mm, inclusive; an L2-4 Groove Angle in the range of 2 degrees to 85 degrees, inclusive; an L2-5 Groove Radius in the range of 0.177 mm to 0.203 mm, inclusive; an L2-6 Chip Cutter in the range of 0.010 mm to 0.350 mm, inclusive; an L2-7 Chip Cutter in the range of 0.010 mm to 0.500 mm, inclusive; an L2-8 Chip Cutter in the range of 0.010 mm to 0.450 mm, inclusive; an L2-9 Chip Cutter Radius in the range of 0.010 mm to 0.025 mm, inclusive; an L3-1 Chip Breaker Diameter in the range of 14.00 mm to 18.00 mm, inclusive; an L4-1 Groove Turn Angle in the range of 0 degrees to 35 degrees, inclusive; an L4-2 Stage 1 Turn Angle in the range of 0 degrees to 35 degrees, inclusive; an L4-3 Stage 2 Turn Angle in the range of 0 degrees to 35 degrees, inclusive; an L5-1 Tip Angle in the range of 0 degrees to 35 degrees, inclusive; and an L5-2 Groove Tip Angle in the range of 0 degrees to 35 degrees, inclusive.

In order to provide a clear and explicit way to understand the claims and the drawings and to provide concise and clear claim language, the features recited in the specification will be referred to in the claims by the language set forth in the list below.

The R1-1 Drill Point Angle will be referred to as the "first drill point angle".
The R1-2 Relief Angle will be referred to as the "first relief angle".
The R1-3 Chip Breaker Diameter will be referred to as the "first chip breaker diameter".
The R1-4 Chip Breaker Diameter will be referred to as the "second chip breaker diameter".
The R2-1 Relief Dimension will be referred to as the "first relief dimension".
The R2-2 Relief Angle will be referred to as the "second relief angle".
The R2-3 Groove Depth will be referred to as the "first groove depth".
The R2-4 Groove Angle will be referred to as the "first groove angle".
The R2-5 Groove Radius will be referred to as the "first groove radius".
The R2-6 Chip Cutter will be referred to as the "first chip cutter".
The R2-7 Chip Cutter will be referred to as the "second chip cutter".
The R2-8 Chip Cutter will be referred to as the "third chip cutter".
The R2-9 Chip Cutter Radius will be referred to as the "first chip cutter radius".
The R3-1 Chip Breaker Diameter will be referred to as the "third chip breaker diameter".
The R4-1 Groove Turn Angle will be referred to as the "first groove turn angle".
The R4-2 Stage 1 Turn Angle will be referred to as the "first stage one turn angle".
The R4-3 Stage 2 Turn Angle will be referred to as the "first stage two turn angle".
The R5-1 Tip Angle will be referred to as the "first tip angle".
The R5-2 Groove Tip Angle will be referred to as the "first groove tip angle".
The L1-1 Drill Point Angle will be referred to as the "second drill point angle".
The L1-2 Relief Angle will be referred to as the "third relief angle".
The L1-3 Chip Breaker Diameter will be referred to as the "fourth chip breaker diameter".
The L1-4 Chip Breaker Diameter will be referred to as the "fifth chip breaker diameter".
The L2-1 Relief Dimension will be referred to as the "second relief dimension".
The L2-2 Relief Angle will be referred to as the "fourth relief angle".
The L2-3 Groove Depth will be referred to as the "second groove depth".
The L2-4 Groove Angle will be referred to as the "second groove angle".
The L2-5 Groove Radius will be referred to as the "second groove radius".
The L2-6 Chip Cutter will be referred to as the "fourth chip cutter".
The L2-7 Chip Cutter will be referred to as the "fourth chip cutter".
The L2-8 Chip Cutter will be referred to as the "fifth chip cutter".
The L2-9 Chip Cutter Radius will be referred to as the "second chip cutter radius".
The L3-1 Chip Breaker Diameter will be referred to as the "sixth chip breaker diameter".
The L4-1 Groove Turn Angle will be referred to as the "second groove turn angle".
The L4-2 Stage 1 Turn Angle will be referred to as the "second stage one turn angle".
The L4-3 Stage 2 Turn Angle will be referred to as the "second stage two turn angle".
The L5-1 Tip Angle will be referred to as the "second tip angle".
The L5-2 Groove Tip Angle will be referred to as the "second groove tip angle".

Non-limiting embodiments have been described, hereinabove. It will be apparent to those skilled in the art that the above methods and apparatuses may incorporate changes and modifications without departing from the general scope of the present subject matter. It is intended to include all such modifications and alterations in so far as they come within the scope of the appended claims or the equivalents thereof.

I claim:
1. A tip dresser blade comprising:
a body being ground to provide a geometry having
a first drill point angle in the range of about 0 degrees to about 35 degrees, inclusive;
a first relief angle in the range of about 0 degrees to about 35 degrees, inclusive;
a first chip breaker diameter in the range of about 9.00 mm to about 16.00 mm, inclusive;
a first relief dimension in the range of about 7.00 mm to about 13.00 mm, inclusive;
a first groove depth in the range of about 0.20 mm to about 0.40 mm, inclusive;

a first groove angle in the range of about 2 degrees to about 85 degrees, inclusive;

a first groove radius in the range of about 0.177 mm to about 0.203 mm, inclusive;

a first chip cutter in the range of about 10.010 mm to about 0.350 mm, inclusive;

a first chip cutter radius in the range of about 0.010 mm to about 0.025 mm, inclusive;

a first groove turn angle in the range of about 0 degrees to about 35 degrees, inclusive; and a first stage one turn angle in the range of about 0 degrees to about 35 degrees, inclusive.

2. The tip dresser blade of claim 1, further comprising:

a second chip breaker diameter in the range of about 13.00 mm to about 20.00 mm, inclusive; and a third chip breaker diameter in the range of about 11.00 mm to about 18.00 mm, inclusive.

3. The tip dresser blade of claim 2, further comprising:

a second relief angle in the range of about 2 degrees to about 85 degrees, inclusive.

4. The tip dresser blade of claim 3, further comprising:

a second chip cutter in the range of about 20.010 mm to about 0.500 mm, inclusive; and a third chip cutter in the range of about 30.010 mm to about 0.450 mm, inclusive.

5. The tip dresser blade of claim 4, further comprising:

a first tip angle in the range of about 0 degrees to about 35 degrees, inclusive; and a first groove tip angle in the range of about 0 degrees to about 35 degrees, inclusive.

6. The tip dresser blade of claim 5, further comprising:

a first stage two turn angle in the range of about 0 degrees to about 35 degrees, inclusive.

7. The tip dresser blade of claim 1, wherein the body is steel hardened to a Rockwell C hardness in the range of 50 to 80, inclusive.

8. The tip dresser blade of claim 7, wherein the body is steel hardened to a Rockwell C hardness in the range of 50 to 63, inclusive.

9. The tip dresser blade of claim 8, wherein the body is steel hardened to a Rockwell C hardness in the range of 66 to 80, inclusive.

10. The tip dresser blade of claim 7, wherein the body is steel hardened to a Rockwell C hardness in the range of 63 to 66, inclusive.

11. The tip dresser blade of claim 7, wherein the steel is chosen from the group consisting of M1, M2, M7, M35, M42, and M50 molybdenum steel.

12. A tip dresser blade comprising:

a body being ground to provide a geometry having a drill point angle in the range of about 0 degrees to about 35 degrees, inclusive;

a relief angle in the range of about 0 degrees to about 35 degrees, inclusive;

a chip breaker diameter in the range of about 9.00 mm to about 16.00 mm, inclusive;

a relief dimension in the range of about 9.00 mm to about 13.00 mm, inclusive;

a groove depth in the range of about 0.20 mm to about 0.40 mm, inclusive;

a groove angle in the range of about 2 degrees to about 85 degrees, inclusive;

a groove radius in the range of about 0.177 mm to about 0.203 mm, inclusive;

a chip cutter in the range of about 10.010 mm to about 0.350 mm, inclusive;

a chip cutter radius in the range of about 0.010 mm to about 0.025 mm, inclusive;

a groove turn angle in the range of about 0 degrees to about 35 degrees, inclusive;

a stage one turn angle in the range of about 0 degrees to about 35 degrees, inclusive;

a tip angle in the range of about 0 degrees to about 35 degrees, inclusive;

and a groove tip angle in the range of about 0 degrees to about 35 degrees, inclusive.

13. The tip dresser blade of claim 12, further comprising:

a second chip breaker diameter in the range of about 13.00 mm to about 20.00 mm, inclusive;

and a third chip breaker diameter in the range of about 11.00 mm to about 18.00 mm, inclusive.

14. The tip dresser blade of claim 13, further comprising:

A second relief angle in the range of about 2 degrees to about 85 degrees, inclusive.

15. The tip dresser blade of claim 14, further comprising:

a second chip cutter in the range of about 20.010 mm to about 0.500 mm, inclusive; and a third chip cutter in the range of about 30.010 mm to about 0.450 mm, inclusive.

16. The tip dresser blade of claim 15, further comprising:

a stage two turn angle in the range of 0 degrees to 35 degrees, inclusive.

17. The tip dresser blade of claim 12, wherein the body is steel hardened to a Rockwell C hardness in the range of 50 to 80, inclusive.

18. The tip dresser blade of claim 17, wherein the body is steel hardened to a Rockwell C hardness in the range of 50 to 63, inclusive.

19. The tip dresser blade of claim 18, wherein the body is steel hardened to a Rockwell C hardness in the range of 66 to 80, inclusive.

20. The tip dresser blade of claim 17, wherein the body is steel hardened to a Rockwell C hardness in the range of 63 to 66, inclusive, wherein the steel is chosen from the group consisting of M1, M2, M7, M35, M42, and M50 molybdenum steel.

* * * * *